United States Patent
Kelly et al.

(10) Patent No.: US 6,877,663 B2
(45) Date of Patent: *Apr. 12, 2005

(54) UNIVERSAL INTERFACE DRIVER SYSTEM FOR DATA READER

(75) Inventors: Brian M. Kelly, Eugene, OR (US);
Jeffrey T. Robson, Eugene, OR (US);
Rockie D. Moch, Eugene, OR (US);
Rick Wright, Bend, OR (US); Thomas E. Tamburrini, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/732,690

(22) Filed: Dec. 10, 2003

(65) Prior Publication Data

US 2004/0118925 A1 Jun. 24, 2004

Related U.S. Application Data

(63) Continuation of application No. 09/872,479, filed on Jun. 1, 2001, now Pat. No. 6,705,527.
(60) Provisional application No. 60/208,989, filed on Jun. 1, 2000.

(51) Int. Cl.$^7$ ................................................. G06K 7/10
(52) U.S. Cl. ............................. 235/462.15; 235/462.01; 235/462.25
(58) Field of Search ............................ 235/375, 462.15, 235/462.25, 462.47, 462.01, 472.01; 710/63, 64

(56) References Cited

U.S. PATENT DOCUMENTS

| | | | |
|---|---|---|---|
| 5,258,604 A | 11/1993 | Behrens et al. | 235/462 |
| 5,497,450 A | 3/1996 | Helmbold et al. | 395/114 |
| 5,557,095 A | 9/1996 | Clark et al. | 235/462 |
| 5,598,070 A | 1/1997 | Coleman | 318/127 |
| 5,664,231 A | 9/1997 | Postman et al. | 395/893 |

(Continued)

FOREIGN PATENT DOCUMENTS

| | | | |
|---|---|---|---|
| EP | 0 546 855 A1 | 6/1993 | G06F/13/38 |
| EP | 1 324 258 A2 | 7/2003 | G06K/7/10 |

OTHER PUBLICATIONS

US 5,680,334, 10/1997, Silva et al. (withdrawn)
Reddersen et al., U.S. Appl. No. 10/652,091, filed Aug. 28, 2003, entitled "Multiple Interface for Data Reader" (note: this application is a continuation of U.S. 6,612,495 cited above).

*Primary Examiner*—Michael G. Lee
*Assistant Examiner*—Ahshik Kim
(74) *Attorney, Agent, or Firm*—Stoel Rives LLP

(57) ABSTRACT

A universal interface driver application specific integrated circuit (UIDA) for a data reading device which supports multiple host interface configurations through the use of shared communications lines. In one application, the UIDA is a 32 or 44-pin TQFP chip located in a bar code scanner, or other data reader, connected to a host processing device such as a computer terminal. The scanner reads and decodes bar codes, transmitting the information to the host processing device through an interconnect cable using a host specific input/output interface protocol. The UIDA contains circuitry to support numerous different host interface protocols, such as RS-232C, IBM46XX, or Keyboard Wedge interface, in order to allow a single data reader to operate with a wide variety of host processing devices. The desired host interface for the data reader is communicated to the device through any one of various methods, such as by signals initiated from the interconnect cable itself or by scanning the information from a configuration bar code. The UIDA then selects the appropriate host interface protocol and configures the scanner for operation with the host processing device.

18 Claims, 20 Drawing Sheets

U.S. PATENT DOCUMENTS

| | | | |
|---|---|---|---|
| 5,682,028 A | 10/1997 | Coleman | 235/462 |
| 5,723,853 A | 3/1998 | Longacre, Jr. et al. | 235/472 |
| 5,767,500 A | 6/1998 | Cordes et al. | 255/472 |
| 5,789,728 A | 8/1998 | Barlie et al. | 235/462 |
| 5,875,415 A | 2/1999 | Lieb et al. | 702/122 |
| 5,905,249 A | 5/1999 | Reddersen et al. | 235/462.15 |
| 6,038,400 A | 3/2000 | Bell et al. | 395/831 |
| 6,041,374 A | 3/2000 | Postman et al. | 710/73 |
| 6,161,760 A | 12/2000 | Marrs et al. | 235/462.15 |
| 6,192,436 B1 * | 2/2001 | Jacobson et al. | 710/104 |
| 6,203,498 B1 | 3/2001 | Bunce et al. | 600/446 |
| 6,293,467 B1 | 9/2001 | Reddersen et al. | 235/462.15 |
| 6,300,880 B1 | 10/2001 | Sitnik | 340/825.25 |
| 6,314,479 B1 | 11/2001 | Frederick et al. | 710/63 |
| 6,536,670 B1 | 3/2003 | Postman et al. | 235/487 |
| 6,560,235 B1 | 5/2003 | Jones | 370/401 |
| 6,612,495 B1 * | 9/2003 | Reddersen et al. | 235/462.15 |
| 6,619,549 B1 * | 9/2003 | Zhu et al. | 235/462.45 |
| 6,705,527 B1 * | 3/2004 | Kelly et al. | 235/472.01 |
| 2003/0057283 A1 | 3/2003 | Zhu et al. | 235/462.45 |
| 2003/0093598 A1 | 5/2003 | Park | 710/63 |
| 2003/0121981 A1 | 7/2003 | Slutsky et al. | 235/462.45 |
| 2003/0131144 A1 | 7/2003 | Weaver | 709/318 |
| 2003/0208652 A1 | 11/2003 | Kuhlmann et al. | 710/305 |
| 2004/0041029 A1 | 3/2004 | Postman et al. | 235/462.3 |

* cited by examiner

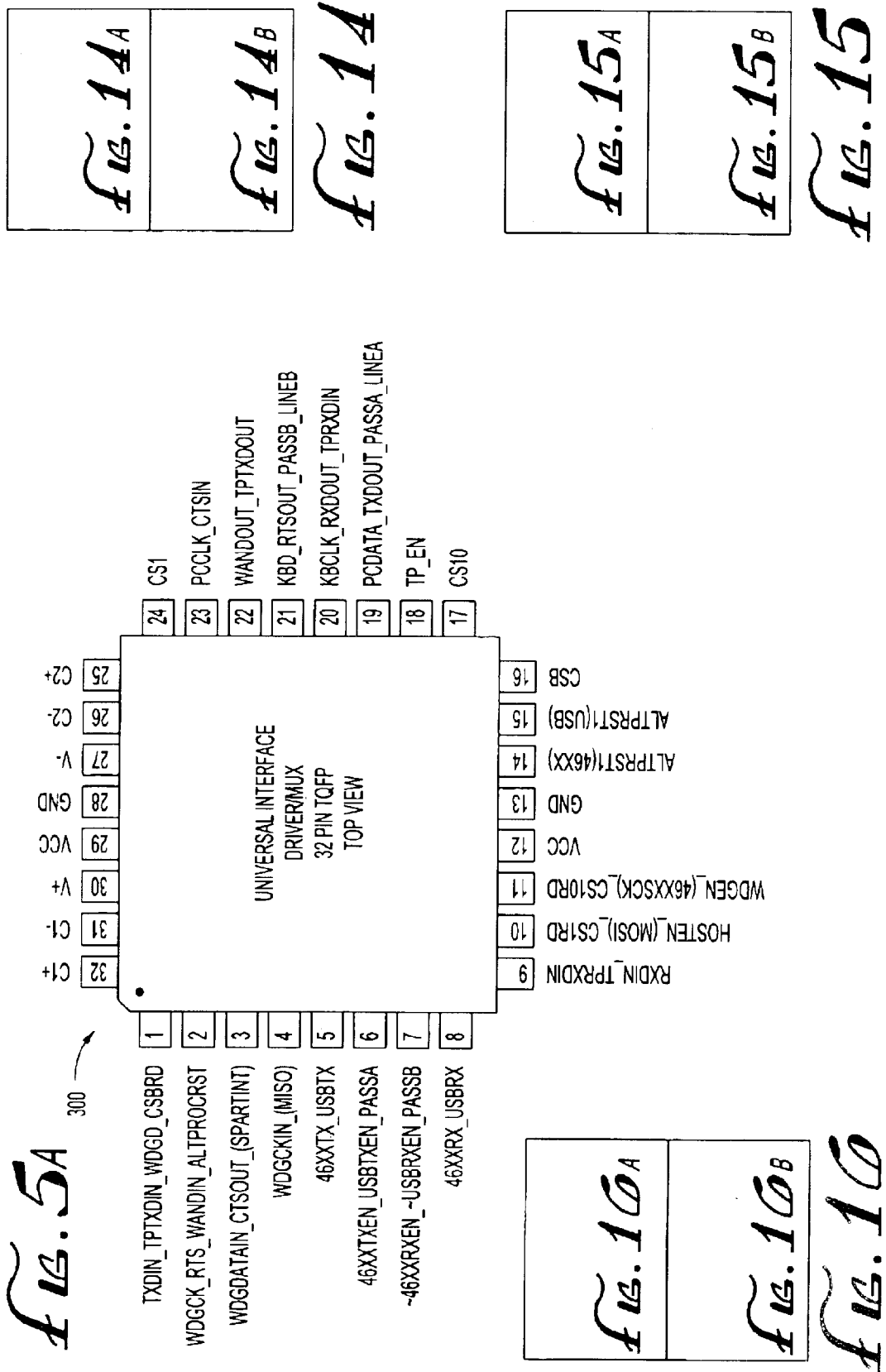

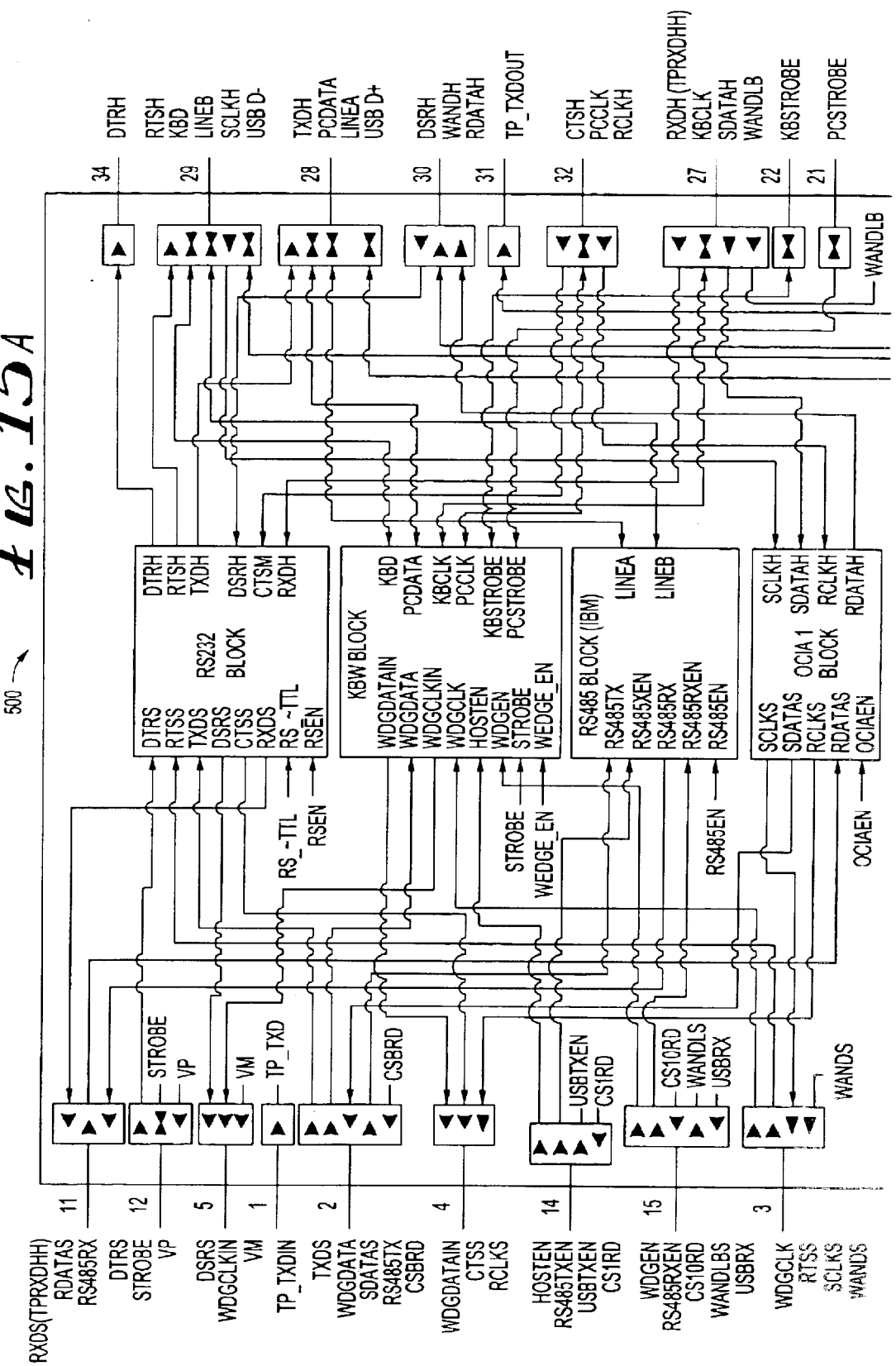

Fig. 16A

| DC CHARACTERISTICS | | MIN | TYP | MAX | NOTES | UNITS |
|---|---|---|---|---|---|---|
| INPUT VOLTAGE | | 3.0 | | 5.5 | EXCLUDING CHARGE PUMP | V |
| INPUT CURRENT QUIESCENT I | Q | | | 1.0 | NO LOAD | mA |
| INPUT CURRENT OPER I | OP | | | TBD | | mA |
| SHUTDOWN CURRENT | | | | 100 | ~CE = VCC | uA |
| LOGIC CMOS | | | | | | |
| INPUT THRESHOLD LOW V | inL | -0.3 | | VCC * 0.18 | | V |
| INPUT THRESHOLD HIGH V | inH | 0.75 * VCC | | VCC + .2 | | V |
| CMOS OUTPUT V LOW V | oL | 0 | | 0.25 | $I_{OUT}$ = 75uA | V |
| CMOS OUTPUT V HIGH V | oH | VCC-0.2 | | | $I_{OUT}$ = -75uA | V |
| INPUT LEAKAGE CURRENT | | | 0.01 | ±1 | | uA |
| OUTPUT LEAKAGE CURRENT | | | | ±10 | | uA |
| LOGIC INPUT CURRENT | | | | ±1 | | uA |
| OUTPUT SOURCE CURRENT | | | 3 | 5 | | mA |
| OUTPUT SINK CURRENT | | | 5 | 10 | | mA |
| LOGIC TTL | | | | | | |
| INPUT THRESHOLD LOW V | inL | | | 0.8 | VCC = 3.0 - 5.5V | V |
| INPUT THRESHOLD HIGH V | inH | 2.0 | | | VCC = 3.0 - 5.5V | V |
| TTL OUTPUT V LOW V | oL | | 0.35 | 0.5 | $I_{OL}$ = 24mA, VCC = 3.0 - 5V | V |
| TTL OUTPUT V HIGH V | oH | 5 | | | $I_{OL}$ = 10mA, VCC = 3.0-5V | V |
| HIGH LEVEL INPUT CURRENT | | | | 20 | VCC = 3.0 - 5V VIN = 2.7 | uA |
| LOW LEVEL INPUT CURRENT | | | | -0.1 | VCC = 3.0 - 5V VIN = 0.4 | uA |
| OUTPUT SOURCE CURRENT | | 10 | | | | mA |
| OUTPUT SINK CURRENT | | 20 | | | | mA |

| VOLTAGE CONVERTER | | | | | | |
|---|---|---|---|---|---|---|
| OPERATING SUPPLY VOLTAGE | 3.0 | | 5.5 | V | VCC = 3.0 TO 5.5V | |
| OUTPUT VOLTAGE | 2*VCC -(2*VCC)-(2*V) BE | | | V | | |
| SUPPLY CURRENT NO LOAD | | 0.12 | 0.5 | mA | | |
| OUTPUT CURRENT | +18 -16 | | | mA | RL=600, (5 RS232 TX LOADS) VCC=5.5V | |
| OSCILLATOR FREQUENCY | 200 | | | kHz | ±10% FREQUENCY TOLERANCE | |
| CAPACITOR SIZE | | | 1.0 | uF | C1, C2, C3 VOLTAGE CONVERTER CIRCUIT | |
| INDUCTOR SIZE | | | 20 | uH | L1, VOLTAGE CONVERTER CIRCUIT | |
| START UP TIME | | 5 | 10 | mS | V± WITHIN SPECIFIED LIMITS, DEVICE READY | |
| POWER EFFICIENCY | 92 | | | % | IL = 10mA | |
| VOLTAGE CONVERSION EFFICIENCY | TBD | | | % | NO LOAD > 90% | |
| ESD | | | | | | |
| ESD PROTECTION | +/- 8KV - IEC1000-4-2 CONTACT DISCHARGE +/- 15KV - IEC1000-4-2 AIR DISCHARGE | | | | PINS -21,22,23,24,25,26,27,29,30, 32,33,34 | |
| ESD PROTECTION | +/- 4KV - IEC1000-2-2 CONTACT DISCHARGE +/- 4KV - IEC1000-2-2 AIR DISCHARGE | | | | REMAINDER WHERE APPLICABLE | |

*Fig. 10B*

UNIVERSAL INTERFACE DRIVER SYSTEM FOR DATA READER

RELATED APPLICATIONS

This application is a Continuation of application Ser. No. 09/872,479 filed Jun. 1, 2001 U.S. Pat. No. 6,705,527 which claims benefit to Application Ser. No. 60/208,989 entitled "Universal Interface Driver System for Data Reader," filed on Jun. 1, 2000, which applications are hereby incorporated by reference as if set forth fully herein.

BACKGROUND OF THE INVENTION

The field of the present invention relates generally to data reading devices, and more particularly to a host interface driver useful in a bar code scanner or other data reading device capable of supporting multiple electronic data formats and/or interface types.

Data reading devices such as bar code scanners and other symbol readers are a popular means for data acquisition in computerized processing systems. These devices are used to optically capture bar code patterns or other symbols or information imprinted on different surfaces in order to transmit the information encoded in the bar code pattern or symbol to a host processing device. Data reading devices may be used in a stand alone configuration, or integrated into terminals.

Bar code scanners in particular are a well-known and common class of data reading device. Two major types of commonly used bar code scanners are flying spot laser scanners and image based bar code scanners. Flying spot laser bar code scanners generally obtain bar code information by sweeping a laser spot across the bar code. The laser spot may be generated from a light source inside an oscillating reflecting surface, typically a mirror. The light reflected from the bar code is collected by a photosensor, which outputs an analog waveform representing the relative spacing of the bars in the bar code. The analog signal may then be digitized and decoded into data representing the information encoded in the bar code.

Bar code scanning devices based on solid state image circuitry, such as charge coupled devices (CCDs), are also conventionally known. These types of bar code scanners are typically implemented using either a one-dimensional or two-dimensional imaging array of photosensors (or pixels) to capture the bar code. One-dimensional CCD readers capture a linear cross section of the bar code at once, producing an analog waveform whose amplitude represents the relative darkness and lightness of the bar code. Two-dimensional CCD readers capture an entire two-dimensional image at once. In either case, the waveform created by reading the bar code is typically digitized and decoded for processing by a host processing device.

Host processing devices perform a variety of functions using data retrieved by bar code scanning devices. One familiar function involves the use of a bar code scanner in conjunction with a point-of-sale register. In a typical application, the bar code symbol of an item to be purchased is scanned, the bar code symbol is digitized and decoded, and the resulting data is used as a key by the host processing device to retrieve the item's description and price from stored memory.

In order to properly communicate with the type of host processing device to which it is connected, bar code scanners commonly employ an appropriate host device interface adapted to the particular characteristics of the intended host device. Examples of some of these interfaces include RS-232, IBM 46XX, keyboard wedge, and others. To illustrate the functionality of a host device interface, the keyboard wedge interface is typically used to interface a bar code scanner with a personal computer. The protocol of the keyboard wedge interface is used to convert data retrieved from the bar code scanner into a signal in the same form as that produced by the computer's keyboard. The computer is then able to process the input signal in the same fashion as keyed input data.

In most cases, different host processing devices use different types of interfaces, thereby requiring various electrical and data formats and protocols. Bar code scanning devices compatible with only a single host device interface have limited functionality because they can only be used with host devices implementing that particular interface. Because of the diversity of interfaces used by different host devices, single interface support significantly reduces the usefulness of a bar code scanning device.

To address these shortcomings, various approaches have been proposed to provide multi-interface functionality within a single bar code scanning device. In U.S. Pat. No. 5,258,604, for example, a system is proposed which implements a bar code scanning device capable of being configured with any one of a plurality of removable/replaceable interface boards inserted in the device's handle, in order to allow the bar code scanner to be used with host processing devices using different input/output interfaces. Replacing the interface board, however, is a difficult task for the typical user, and generally requires the services of a skilled technician. Moreover, because the interface board must be removed and replaced whenever the bar code scanner is used with a host processing device having a different host interface, the removal and replacement of the interface board on an ongoing basis can be unwieldy, inefficient, and time consuming. Such a process may also damage the interface board due to electrostatic discharge (ESD) problems when the interface board is manually handled.

U.S. Pat. No. 5,905,249, discloses several systems, one of which comprises an interface between a data acquisition device (such as a bar code scanner) and a host processing device accomplished through the use of a selected one of a plurality of interface cables. The data acquisition device is provided with multiple interface capabilities. The interface cable functions as the host-specific link between the data acquisition device and the host processing device, whereby the cable itself functions to have the data acquisition device set its own interface or otherwise combines with the acquisition device in order to communicate properly with the host. Use of different interconnect cables to form the correct host interface is much easier and more efficient than swapping circuit boards in order to configure the scanner. Moreover, there may be size constraints on scanner circuit boards, a situation which limits the number and type of host interfaces that can be supported by a single device.

At the same time, the physical size of bar code scanners continues to decrease due to market demand, placing space constraints on scanner circuit boards for the electronic components needed to implement multiple interface solutions. With bar code scanners supporting as many as three or more interfaces, the limits of current circuit board technology are being reached, and the cost to implement such combinations is becoming economically unfeasible.

There are also electrical constraints associated with current multi-interface designs. A common host device interface protocol, RS-232C, is often used when bar code scanning devices are connected directly to personal computers. The components commonly used in implementing the RS-232C interface are electronically incompatible with the components of other interface protocols generally used with bar code scanners. This incompatibility requires the use of electromechanical relays on the circuit board or other means to isolate other interface circuitry from the bipolar drive signal generated by the RS-232C circuitry. Depending on the interface pairings, one or more of these added electromechanical relays must be employed to provide the necessary circuit isolation. The relays are large and expensive, using up a large portion of the available scanner circuit board space. While other electrical techniques exist that can provide similar circuit isolation, they generally require equal or greater circuit board space and are equivalent in cost to the electromechanical relays. It would therefore be advantageous to provide a data reading device such as a bar code scanner capable of flexibly interfacing with a variety of different host devices. It would further be advantageous to provide such a data reading device having interface circuitry which is relatively compact and compatible among various different interface protocols.

SUMMARY OF THE INVENTION

The present invention relates in one aspect to a "universal" interface driver preferably taking the form of what is referred to herein as a Universal Interface Driver ASIC (UIDA) capable of supporting multiple electronic data interface types using shared communications lines, for use in a data reader or other acquisition device. In a preferred embodiment, interface circuitry ordinarily housed on the data reader's interface driver circuit board is instead integrated onto the UIDA. Combining the circuitry supporting multiple host interfaces into an ASIC (Application Specific Integrated Circuit) generally allows for more compact circuit assemblies within the data reader and may increase the number of host device interfaces that are supported by a given data acquisition device.

In a preferred embodiment, the UIDA supports any combination of at least the following interfaces and functions: 1) RS-232C, 2) IBM46XX, 3) USB, 4) Keyboard Wedge, 5) Wand Emulation, 6) Test Port, 7) Pass Through, and 8) Cable Select Read Back. In addition to these interfaces and functions, other preferred embodiments of the UIDA may also support 9) RS232 TTL functionality and 10) Optically Coupled Interface Adapter (OCIA) functionality. Use of shared communications lines between the various interfaces/functions facilitates their integration onto the UIDA. The switches or relays (e.g., electromechanical relays, analog switches, or high voltage transmission gates) typically needed to isolate RS-232 circuitry from other incompatible interface circuitry in multi-interface designs are also preferably integrated onto the UIDA. The integration of this isolation circuitry onto the UIDA results in a reduction of the size and cost of the interface driver circuitry needed for multiple interface functionality.

In another preferred embodiment, the UIDA is configured to replace the interface driver circuitry for existing data reading devices in order to provide multiple interface driver functionality. Such data reading devices may include, but are not limited to, bar code scanners, CCD imagers, RFID readers, magnetic strip readers, and data reader integrated terminals. The UIDA can either be integrated into the data reading device, or else be located in a separate unit to which the data reading device connects. Further embodiments, variations and enhancements are also described herein.

Additional aspects and advantages of this invention will be apparent from the following detailed description of preferred embodiments, which proceeds with reference to the accompanying drawings.

BRIEF DESCRIPTION OF THE DRAWINGS

FIG. 5(*b*) is a top view of an example of a 44-pin UIDA.

FIGS. 14, 14A, 14B comprise a circuit block diagram of the UIDA in FIG. 4, shown in a mode capable of supporting both RS-232C and RS-232 TTL interface protocols.

FIGS. 15, 15A, 15B comprise a circuit block diagram of the UIDA in FIG. 4, shown in an Optically Coupled Interface Adapter (OCIA) mode.

FIG. 16, 16A, 16B comprise a diagram showing the general electrical specifications of the UIDA circuitry.

DETAILED DESCRIPTION OF PREFERRED EMBODIMENTS

Preferred embodiments will not be described, with reference as necessary to the accompanying drawings.

Figure 1:
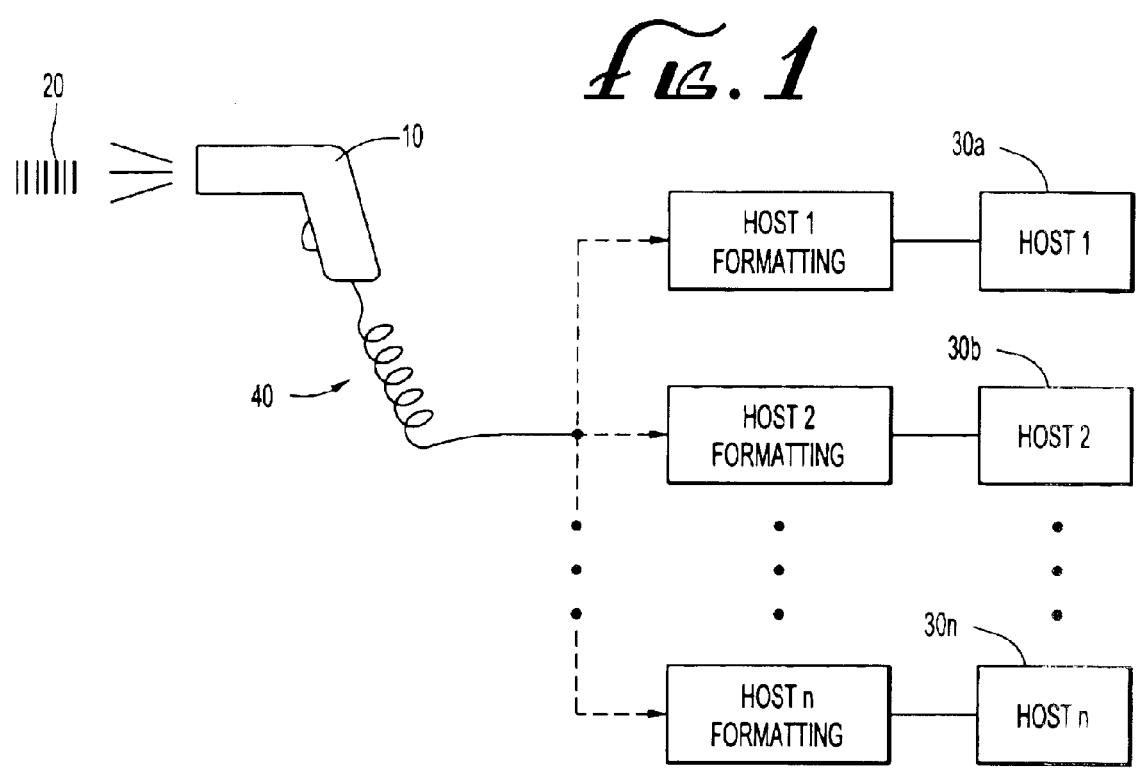
FIG. 1 is a diagrammatic view of a handheld laser scanning device attached to a host processing device.

FIG. 1 is a block diagram illustrating an example of a handheld data reading device 10 such as a flying spot laser bar code scanner, an imaging data reader (e.g., CCD reader), or other device which is used to scan and potentially translate symbols (such as bar codes 20) into digital signals to be transmitted to any one of a variety of host processing devices 30*a*, 30*b*, . . . 30*n* to which it is connected. The data reading device 10 is operably connected to a host processing device 30*a* via a host interconnect cable 40. The interconnect cable 40 provides a communication link between the data reading device 10 and the host device 30*a*, and may also provide the electric power input to the data reading device 10. As indicated in FIG. 1, the data reading device 10 may be attached and operated in conjunction with any one of various host processing devices 30*a*, 30*b*, . . . 30*n* supported by different host interface protocols.

Figure 2:
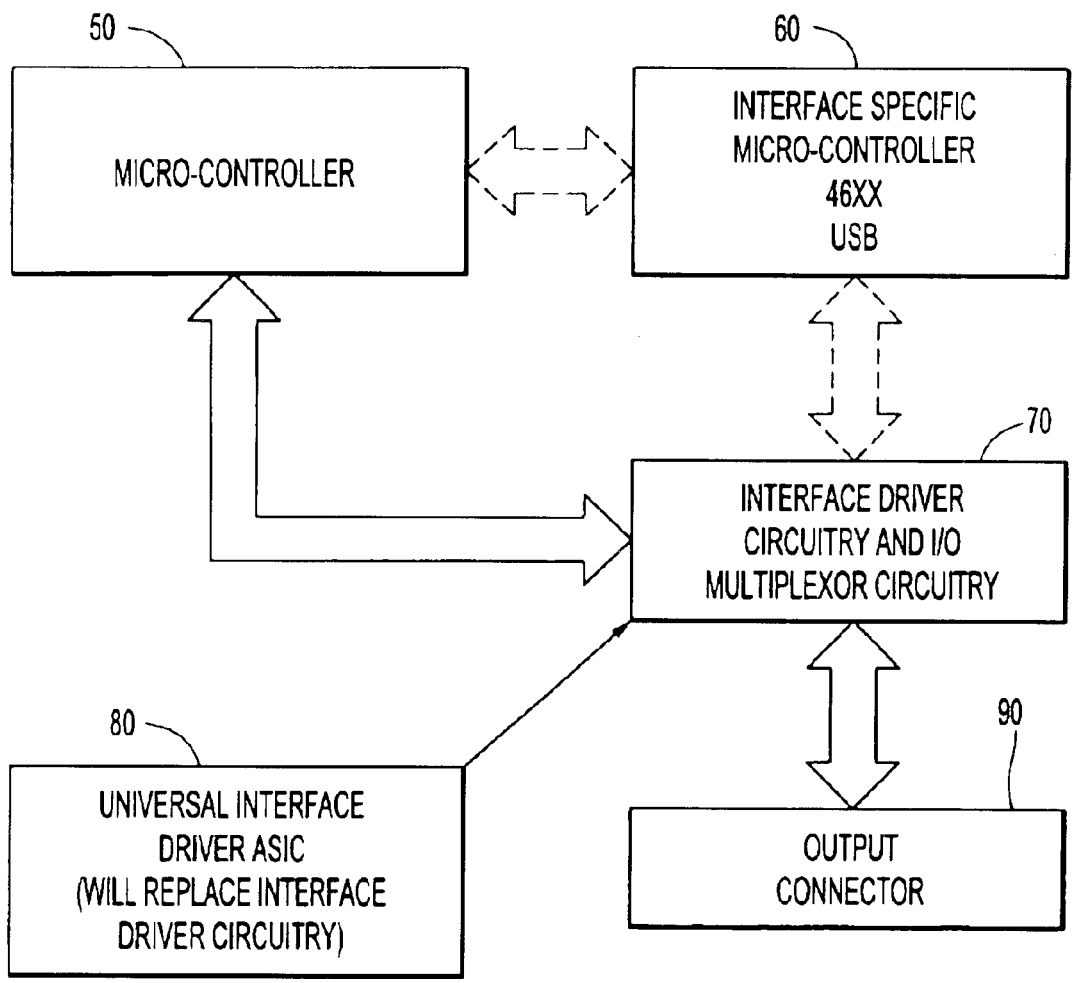
FIG. 2 is a functional diagram of bar code scanner control blocks.

FIG. 2 illustrates a functional block diagram of a handheld data reading device 10, such as a bar code scanner. As illustrated in FIG. 2, the data reading device 10 preferably includes functional features of a micro-controller 50, an interface specific micro-controller 60, an interface driver block 70, and an output connector block 90. In a preferred embodiment, a universal interface driver 80 (which may be embodied in an ASIC) replaces the functionality of the interface driver block 70. The micro-controller 50 functions to decode targets (for example, scanned bar codes), as well as to manage host interface operation and control. The interface specific micro-controller 60 may be used in addition to the primary micro-controller 50 when certain host interfaces are supported (e.g., an IBM 46XX host interface or a Universal Serial Bus (USB) host interface). The interface driver block 70 contains the associated driver circuitry for the host interfaces supported by the data reading device 10. The interface driver block 70 selects the particular interface driver circuitry to be used when sending data signals to the output connector 90. The output connector 90 functions to route data signals between the data reading device 10 and host processing device 30 via the host interconnect cable 40.

The Universal Interface Driver ASIC 80 replaces the functionality of the interface driver block 70 by integrating multiple host interface circuitry into an application specific integrated circuit. As described in relation to the structure and function of various embodiments depicted in FIGS. 3 through 15, there are several advantages that may be achieved by combining the interface driver block 70 of the handheld laser scanner 10 into an ASIC. Because the majority of circuitry, representing the majority of cost, for implementing conventional multiple host interfaces is located in the interface driver block 70, integration of the circuitry into a UIDA in accordance with various preferred embodiments described herein has the advantage of decreasing the cost of multiple interface implementation. Additionally, the interface driver block 70 in conventional data reading devices often consumes the majority of the available interface circuit board space within the data reading device 10, particularly in conventional bar code scanners. Replacing the interface driver block 70 with the UIDA, as explained with respect to various preferred embodiments described herein, frees up much of this circuit board space for other uses, such as allowing for more compact data reading device designs.

In conventional data reading devices, there are also typically electrical constraints inherent to the interface driver block 70 which affect implementation of the popular RS-232C protocol, that can be eliminated by integrating the interface driver block 70 onto a UIDA in accordance with various preferred embodiments described herein. When RS-232 interface circuitry is included with other host interface circuitry on the interface driver block 70, electromechanical relays are conventionally used to isolate the other interface circuitry from the bipolar drive signal generated by the RS-232 protocol. The relays are commonly large and expensive, consuming a significant portion of the available circuit board space on the interface driver block 70 and significantly increasing the cost of multi-interface scanners. By integrating isolation circuitry (e.g., micromachined electromechanical relays, analog switches, or high voltage transmission gates) onto the UIDA, multiple host interfaces with both bipolar and unipolar drive signals can be implemented at a much lower cost than currently associated with implementation on the interface driver block 70. Integration of the interface circuitry onto the UIDA 80 may also allow the data reading device 10 to support more host interfaces than is currently possible using a conventional interface driver block 70.

Figure 3:
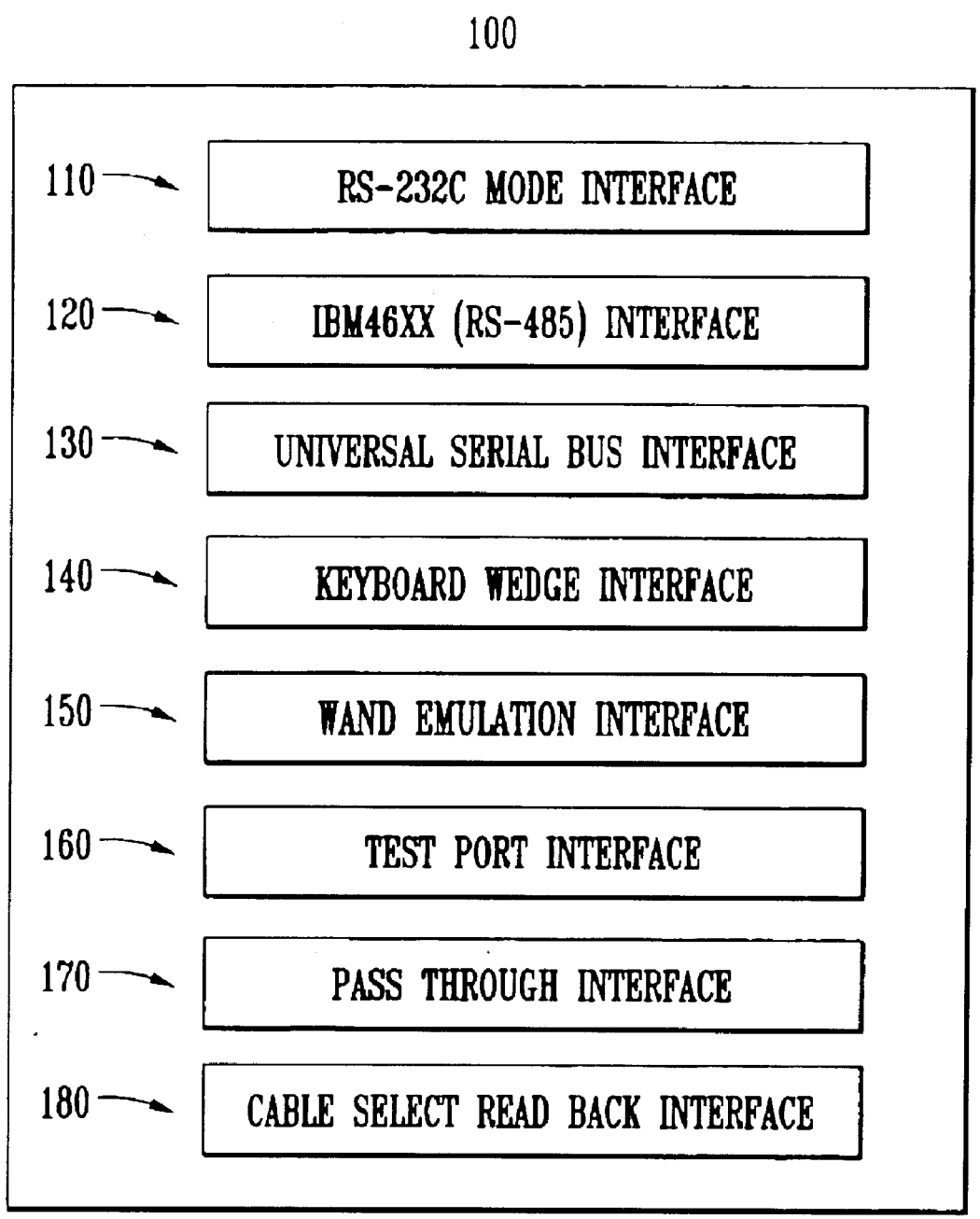
FIG. 3 is a block diagram of a preferred embodiment of a Universal Interface Drive ASIC with supported host driver interfaces.

In a preferred embodiment, the UIDA contains interface circuitry supporting multiple host device interfaces and functions. FIG. 3 is a block diagram illustrating a preferred embodiment wherein different host device interfaces and functions are implemented on a universal interface driver ASIC (UIDA) 100. In a preferred configuration, the following interfaces are supported on a single UIDA 100:

1) RS-232C mode interface 110—the UIDA 100 supports RS-232C transmit and receive modes as well as RTS/CTS flow control.
2) IBM 46XX mode interface 120—the UIDA 100 supports half duplex RS485 differential transmit and receive modes required for IBM 46XX protocols.
3) Universal Serial Bus (USB) mode interface 130—the UIDA 100 supports USB differential transmit and receive high speed (12 Mbits/s) and low speed (1.5 Mbits/s) modes required for USB protocols.
4) Keyboard Wedge mode interface 140—the UIDA 100 supports implementation of the keyboard wedge interface which supports XT/AT/PS2 interface types.
5) Wand Emulation mode interface 150.
6) Test Port mode interface 160.
7) Pass Through mode interface 170.
8) Cable Select Read Back mode interface 180—the UIDA 100 allows the system micro-controller 50 to read back the current state of the cable select pins, thereby eliminating the need to use two dedicated I/O pins on the system micro-controller 50 for that task.

In addition to the interfaces discussed above, another preferred embodiment of the UIDA will also support the following interfaces:

9) RS-232C/ITTL mode interface—the UIDA 100 is capable of supporting both RS-232 TTL transmit and receive levels and RS-232C (RTS/CTS flow control) modes.
10) OCIA (Optically Coupled Interface Adapter)—the UIDA 100 is capable of supporting the OCIA protocol for both handheld and fixed scanner types. The OCIA signals will pass through the UIDA 100 and be routed to the appropriate interface cable circuits. Optical isolators associated with this interface type will be integrated into the host interface cable 40.

Figure 4:
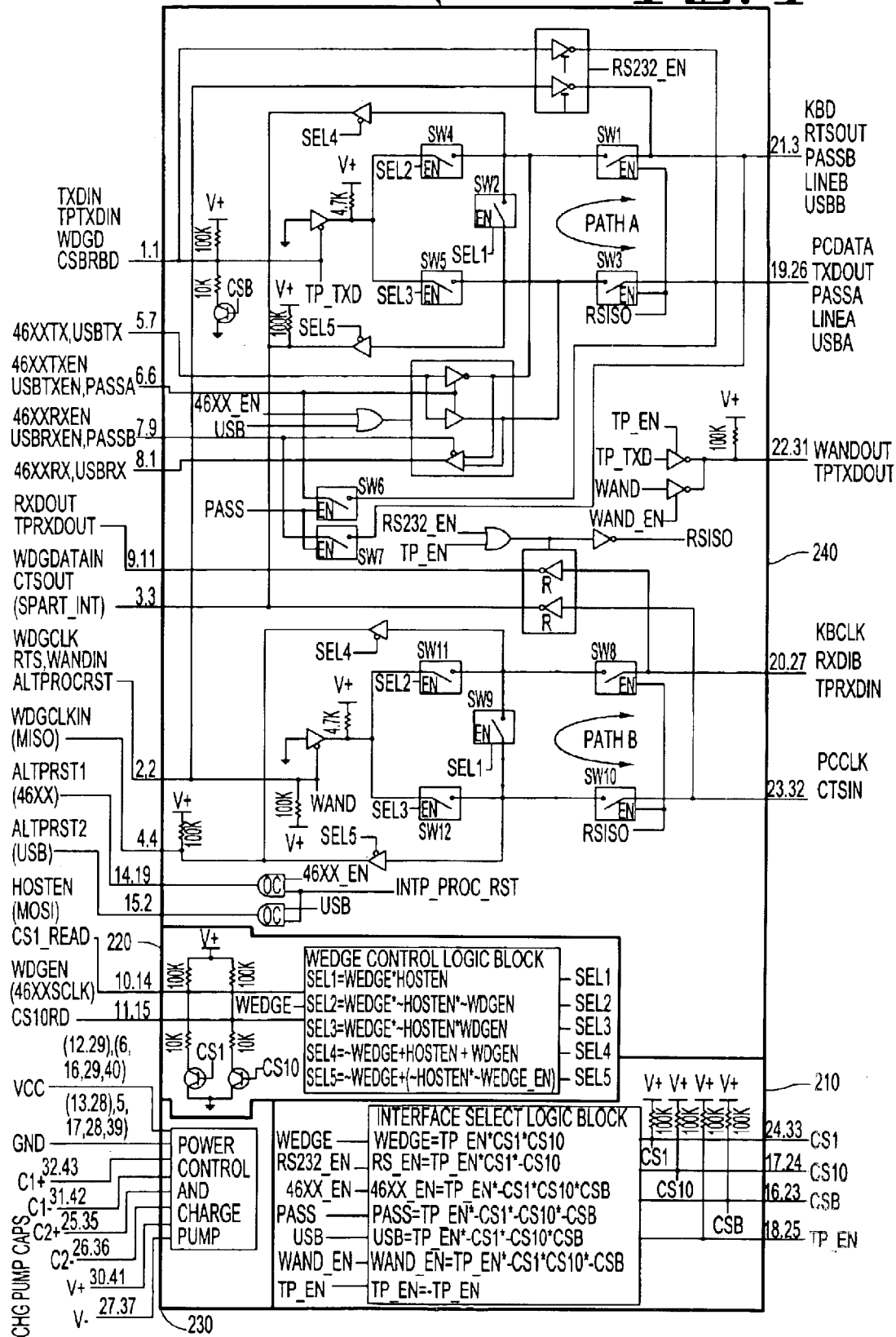
FIG. 4 is a more detailed circuit block diagram of an embodiment of the Universal Interface Driver ASIC depicted at a higher level in FIG. 3.
Figure 5B:
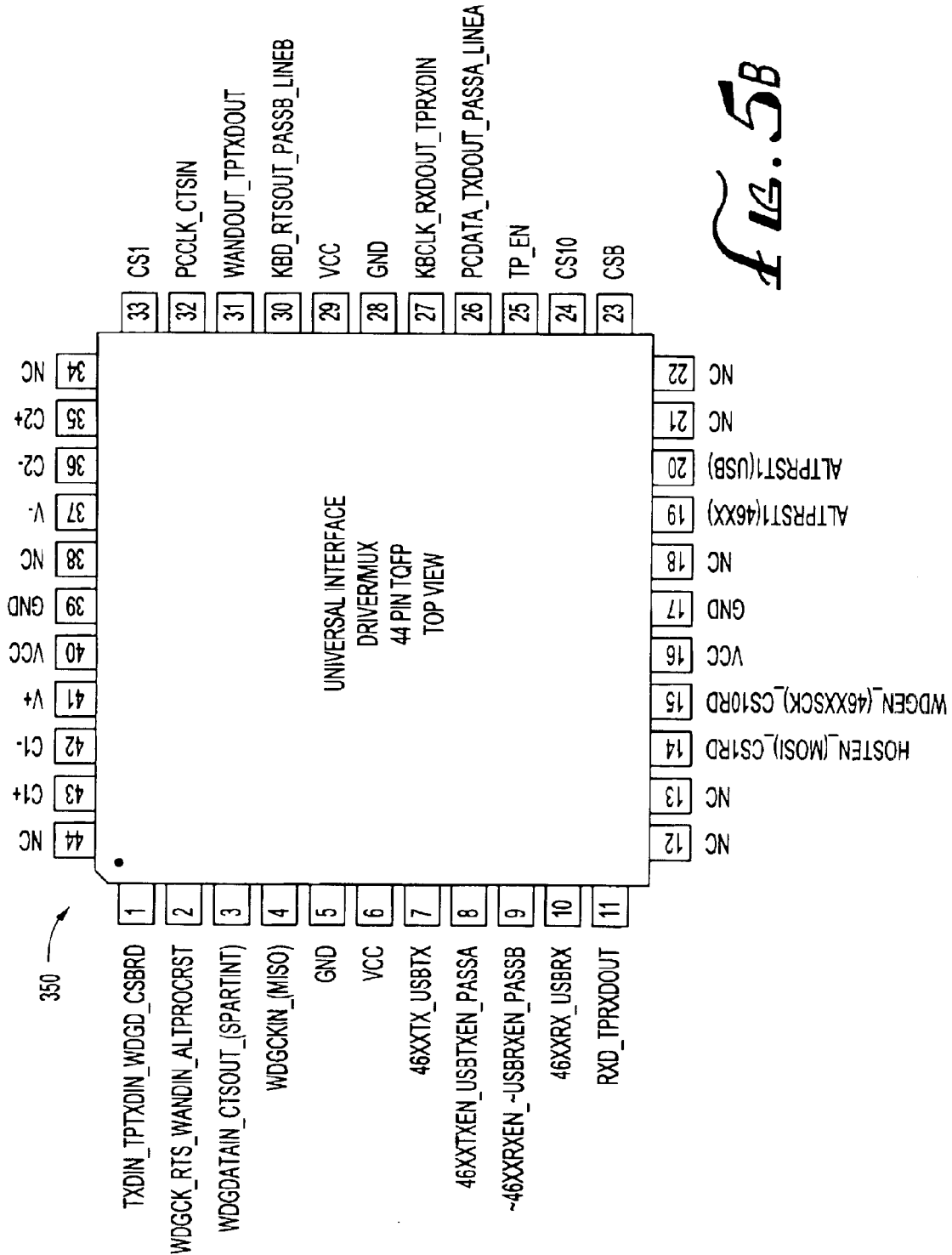
FIG. 5(*a*) is a top view of an example of a 32-pin UIDA.

FIG. 4 is a detailed circuit schematic diagram illustrating a preferred circuit embodiment of the UIDA 200. A preferred embodiment of the UIDA 200 is a 32-pin thin quad flatpack (TQFP) chip 300, as depicted in FIG. 5(a). Another preferred embodiment of the UIDA 200 is a 44-pin TQFP chip 350, as depicted in FIG. 5(b). The various pins of the 32-pin UIDA chip 300 and 44-pin UIDA chip 350 have functions as set forth on the pin assignments designated in Table A below:

TABLE A

| Pin # 32 TQFP | Pin # 44 TQFP | PIN NAME |
|---|---|---|
| 1 | 1 | TXDIN_TPXDIN_WDGD_CSBRD |
| 2 | 2 | WDGCK_RTS_WAND_ALTPROCRST |
| 3 | 3 | WDGDATAIN_CTSOUT_(SPARTINT) |
| 4 | 4 | WDGCKIN_(MISO) |
| — | 5 | GND |
| — | 6 | VCC |
| 5 | 7 | 46XXTX_USBTX |
| 6 | 8 | 46XXTXEN_USBTXEN_PASSA |
| 7 | 9 | ~46XXRXEN_~USBRXEN_PASSB |

TABLE A-continued

| Pin # 32 TQFP | Pin # 44 TQFP | PIN NAME |
|---|---|---|
| 8 | 10 | 46XXRX_USBRX |
| 9 | 11 | RXDOUT_TPRXDOUT |
| — | 12 | NC |
| — | 13 | NC |
| 10 | 14 | HOSTEN_(MOSI)_CS1RD |
| 11 | 15 | WDGEN_(46XXSCK)_CS10RD |
| 12 | 16 | VCC |
| 13 | 17 | GND |
| — | 18 | NC |
| 14 | 19 | ALTPRST1(46XX) |
| 15 | 20 | ALTPRST2(USB) |
| — | 21 | NC |
| — | 22 | NC |
| 16 | 23 | CSB |
| 17 | 24 | CS10 |
| 18 | 25 | TP_EN |
| 19 | 26 | PCDATA_TXDOUT_PASSA_LINEA_USBA |
| 20 | 27 | KBCLK_RXDIN_TPRXDIN |
| — | 28 | GND |
| — | 29 | VCC |
| 21 | 30 | KBD_RTSOUT_PASSB_LINEB_USBB |
| 22 | 31 | WAND_TPTXDOUT |
| 23 | 32 | PCCLK_CTSIN |
| 24 | 33 | CS1 |
| — | 34 | NC |
| 25 | 35 | C2+ |
| 26 | 36 | C2− |
| 27 | 37 | V− |
| — | 38 | NC |
| 28 | 39 | GND |
| 29 | 40 | VCC |
| 30 | 41 | V+ |
| 31 | 42 | C1− |
| 32 | 43 | C1− |
| — | 44 | NC |

Table A lists function names along with the assigned pin numbers for both the 32-pin UIDA chip 300 and the 44-pin UIDA chip 350. It should be noted that the assignment of signals to a TQFP pin is made based on expected final signal locations for a particular configuration as well as for documentation reference. The final pin number assignments would ultimately be based on the floor plan of the die, which may vary depending upon the application. The functions associated with the pins listed in Table A are described in more detail below in conjunction with the details of the UIDA circuitry 200.

In a preferred embodiment, the UIDA 200 is composed of four functional blocks: an Interface Select Logic Block 210, a Wedge Control Logic Block 220, a Power Control and Charge Pump Block 230, and an Interface Circuit Block 240. The Interface Select Logic Block 210 functions to set the current interface configuration of the UIDA 200. FIGS. 6 through 15 illustrate different interface circuit configurations which may be supported by the UIDA 200 through selection via the Interface Select Logic Block 210. In alternative embodiments, different combinations of the interface circuitry may be used, and not all of the host interfaces need be supported.

Several different techniques may be used to communicate a desired host interface setting to the UIDA's 200 Interface Select Logic Block 210 in order to configure the data reading device 10 for operation with a particular host device 30. One such technique described in U.S. Pat. No. 5,905,249 (hereby incorporated by reference as if set forth fully herein) involves setting the device configuration by choosing the appropriate interconnect cable 40 that corresponds to a given host device 30. The electrically connected pins in the interconnect cable provide the switching necessary within the data reading device 10 to activate the correct interface circuitry, configuring the data reading device for use with the host 30.

U.S. Pat. Nos. 4,861,972 and 4,866,257 (herein incorporated by reference as if set forth fully herein) disclose techniques for configuring a data reader such as a bar code scanner for use with a specific host interface by scanning a programming bar code or obtaining the info from an RFID tag (the '972 patent), or by downloading information from the host computer (the '257 patent). U.S. Pat. No. 5,905,249 also discloses methods whereby the bar code used to configure the scanner for a particular host is attached directly to the interconnect cable or elsewhere. By selecting the correct interconnect cable for the desired host device and reading the bar code or RFID tag, the reader will be configured for use with that host.

Any of these methods, or other suitable methods, may be used communicate a desired host interface protocol to the Interface Select Logic Block 210 of the UIDA 200 in order to set the configuration of the data reading device 10. Within the Interface Select Logic Block 210, the pins designated as CS1, CS10 and CSB function by their signal to set the interface configuration of the UIDA 200. Depending on which pin signals are received, the Interface Select Logic Block 210 configures the UIDA 200 to support any of the host interface protocols illustrated in FIGS. 6 through 13. Table B below illustrates which interface protocol configuration is set by the Interface Select Logic Block 210 based on the different pin signal combinations of CS1, CS10 & CSB in one embodiment as described herein:

TABLE B

| CS1 | CS10 | CSB | INTERFACE |
|---|---|---|---|
| 0 | 0 | 0 | Pass |
| 0 | 1 | 0 | Wand |
| 1 | 0 | 0 | RS-232 |
| 1 | 1 | 0 | Keyboard Wedge |
| 0 | 0 | 1 | USB |
| 0 | 1 | 1 | IBM46XX |
| 1 | 0 | 1 | RS-232 |
| 1 | 1 | 1 | Keyboard Wedge |

Table E below illustrates which interface protocol configuration is set by the interface Select Logic Block 210 based on the different pin signal combinations of CS1, CS10 & CSB in another preferred embodiment of the UIDA 200 as described herein:

TABLE E

| CS1 | CS10 | CSB | INTERFACE |
|---|---|---|---|
| 0 | 0 | 0 | USB (Low Speed) |
| 0 | 1 | 0 | Wand |
| 1 | 0 | 0 | RS-232 |
| 1 | 1 | 0 | Keyboard Wedge |
| 0 | 0 | 1 | USB/USB IBM (Full Speed) |
| 0 | 1 | 1 | IBM46XX |
| 1 | 0 | 1 | RS-232 |
| 1 | 1 | 1 | OCIA |

The pin designated TP_EN in the in the Interface Select Logic Block 210 shown in FIG. 4 functions as a Test Port interface 160 enable pin. The active low signal for this pin places the UIDA 200 in a mode which enables the transmission and reception of test port signals. This signal overrides the current state of all cable selects inputs.

The Wedge Control Logic Block 220 of the UIDA 200 shown in FIG. 4 preferably controls the direction of the keyboard data and keyboard clock generated by the system micro-controller 50 when the Keyboard Wedge interface 140 is selected by the Interface Select Logic Block 210. The pins designated HOSTEN_(MOSI) CS1 RD and WDGEN_(46XXSCK)_CS10RD are multifunction pins which control the wedge data direction when the UIDA 200 is configured in Keyboard Wedge mode. Table C below is an example showing the wedge data direction of the UIDA 200 based on the different combinations of the above pin signals:

TABLE C

| HOSTEN | WDGEN | DATA DIRECTION |
|---|---|---|
| 0 | 0 | Wedge to Keyboard |
| 0 | 1 | Wedge to Host |
| 1 | 0 | Keyboard to Host |
| 1 | 1 | Loop Back Test |

The Power Control and Charge Pump Block 230 of the UIDA 200 functions to handle the electrical current distribution in the UIDA 200. The pins within this block 230 function as follows. The pins designated VCC function as the system power input. The pins designated GND function as the system ground input. The pins designated C1+ and C1− are connected together through a series capacitor and serve as the first charge pump capacitor inputs. The pins designated C2+ and C2− are also connected together through a series capacitor and serve as the second charge pump capacitor inputs. The pin designated V+ is the positive supply output of the charge pump. This pin is connected to the system power input through a filter capacitor. The pin designated V− is the negative supply output of the charge pump. This pin is connected to the ground through a filter capacitor.

Figure 14A:
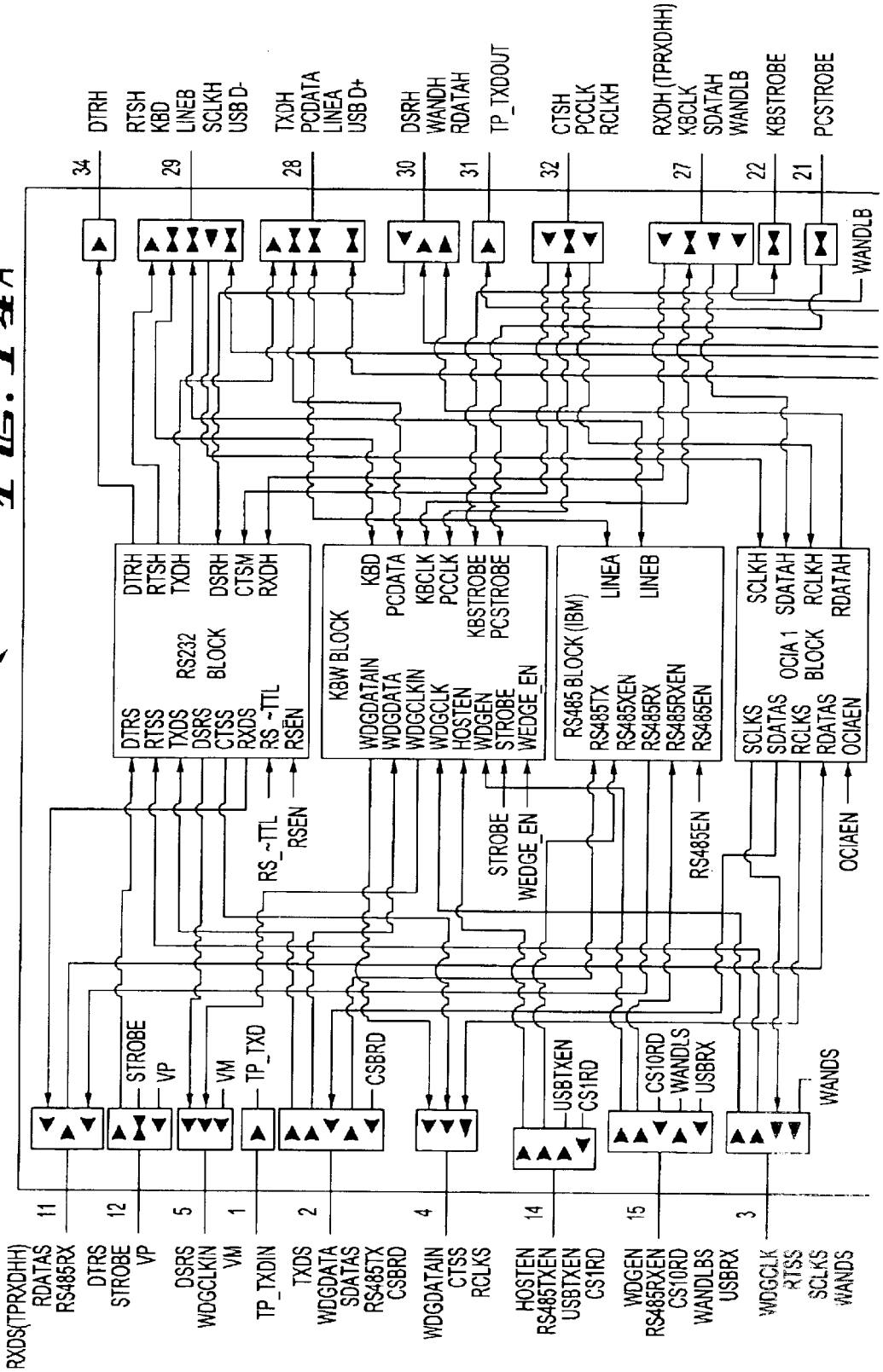
Figure 14B:
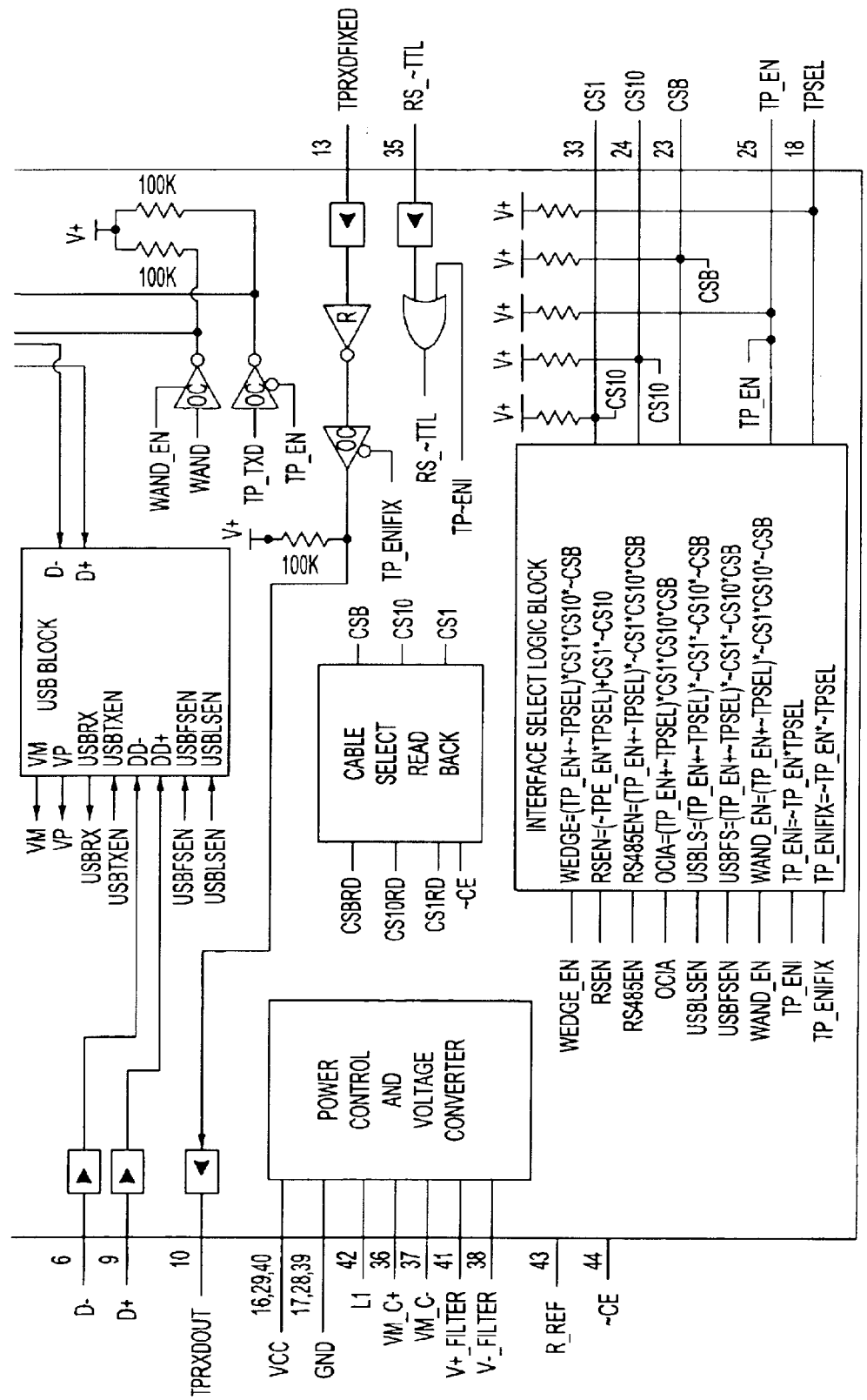
Figure 15B:
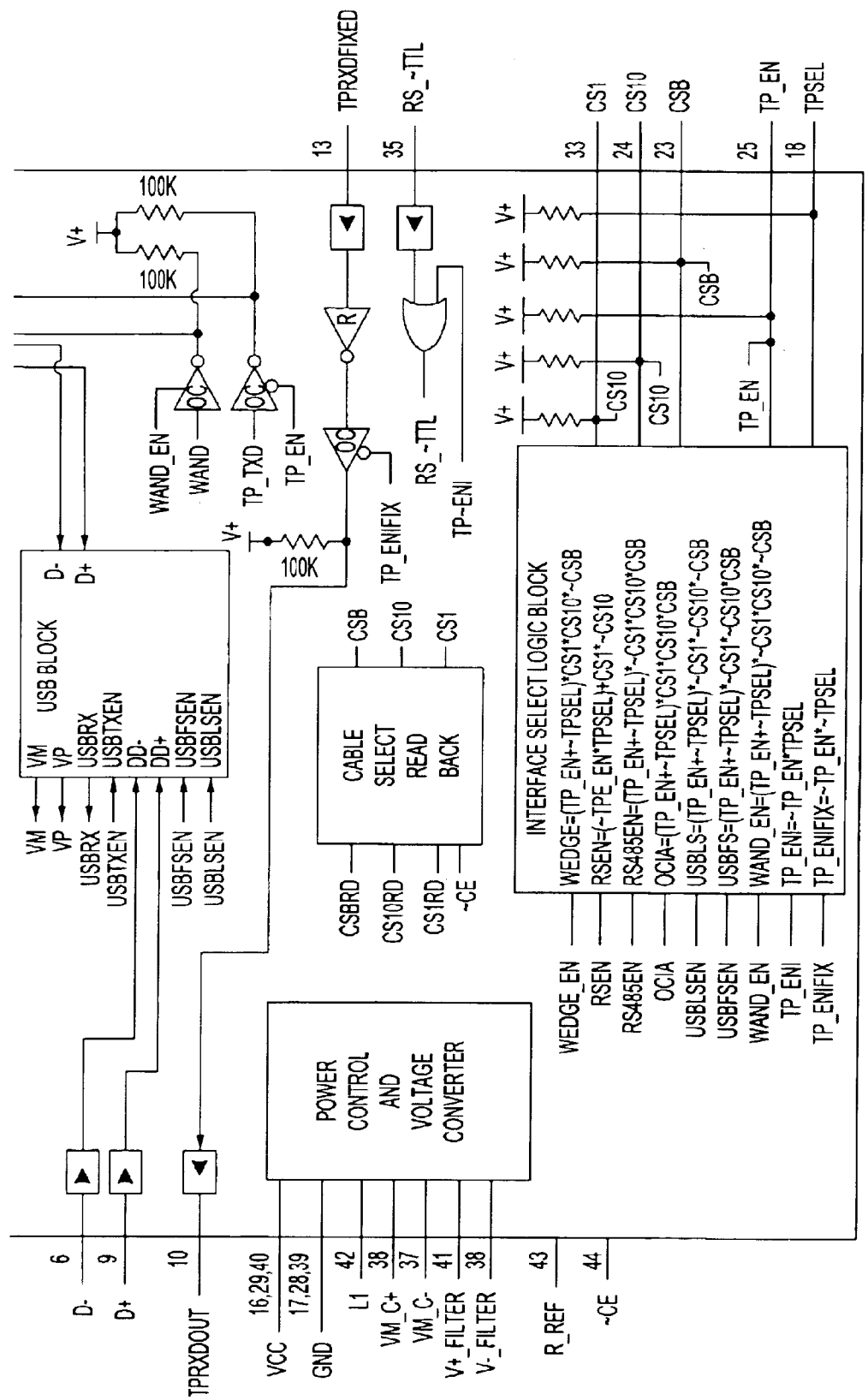

The Interface Circuit Block 240 of the UIDA 200 houses the integrated circuitry for all supported host interface configurations. Use of shared communications lines facilitates this degree of integration into a single functional circuit block 240. In a preferred embodiment, the UIDA 200 houses circuitry for eight different host interface protocols as illustrated in FIG. 3: 1) RS-232C 110, 2) IBM46XX 120, 3) USB 130, 4) Keyboard Wedge 140, 5) Wand 150, 6) Test Port 160, 7) Pass Through 170, and 8) Cable Select Read Back 180. Detailed circuit block diagrams for each of these host interface protocols are illustrated in FIGS. 6–13. Other preferred embodiments of the UIDA 200 may also support other host interface protocols such as 9) RS-232 TTL, and 10) OCIA, as illustrated in FIGS. 14 and 15. Electrical specifications for a preferred embodiment of the UIDA 200 circuitry are shown in FIG. 16. The specifications are general in nature, as most of the functions are well known in the art of electrical engineering and integrated circuitry.

Depending on the signal settings of the CS1, CS10, and CSB pins of the Interface Select Logic Block 210, the UIDA 200 may be configured to support any of the above named host interfaces. This configuration capability allows the input scanning device 10 to decode and transmit bar code data to any number of host devices 30 in the protocol required by the device, without requiring multiple scanners to support different host interfaces.

Table D lists the signals and corresponding pin assignments for each of the different host interface types supported by a preferred embodiment of by the UIDA 200.

TABLE D

| RS-232C | 46XX/USB | USB | KEYBOARD WEDGE | WAND | PASS | CABLE SELECT/ | TEST PORT | PIN # 32 | PIN # 44 |
|---|---|---|---|---|---|---|---|---|---|
| TXDIN | | | WDGD | | | CSBRD | TPTXDIN | 1 | 1 |
| RTS | ALTPROCRST | | WDGCK | WANDIN | | | | 2 | 2 |
| CTSOUT | (SPARTINT) | | WDGDATAIN | | | | | 3 | 3 |
| | (MISO) | | WDGCKIN | | | | | 4 | 4 |
| | 46XXTX | USBTX | | | | | | 5 | 7 |
| | 46XXTXEN | USBTXEN | | | PASSA | | | 6 | 8 |
| | ~46XXRXEN | ~USBRXEN | | | PASSB | | | 7 | 9 |
| | 46XXRX | USBRX | | | | | | 8 | 10 |
| RXDOUT | | | | | | | TPRXDOUT | 9 | 11 |
| | (MOSI) | | HOSTEN | | | CS1RD | | 10 | 14 |
| | (46XXSCK) | | WDGEN | | | CS10RD | | 11 | 15 |
| | ALTPRST1 | | | | | | | 14 | 19 |
| | | ALTPRST2 | | | | | | 15 | 20 |
| | | | | | | CSB | | 16 | 23 |
| | | | | | | CS10 | | 17 | 24 |
| | | | | | | | TP_EN | 18 | 25 |
| TXDOUT | LINEA | USBA | PCDATA | | PASSA | | | 19 | 26 |
| RXDIN | | | KBCLK | | | | TPRXDIN | 20 | 27 |
| RTSOUT | LINEB | USBB | KBD | | PASSB | | | 21 | 30 |
| | | | | WANDOUT | | | TPTXDOUT | 22 | 31 |
| CTSIN | | | PCCLK | | | | | 23 | 32 |
| | | | | | | CS1 | | 24 | 33 |

The following is a description of the functionality of each interface circuit configuration according to various preferred embodiments as described herein.

RS-232C Mode

Figure 6:
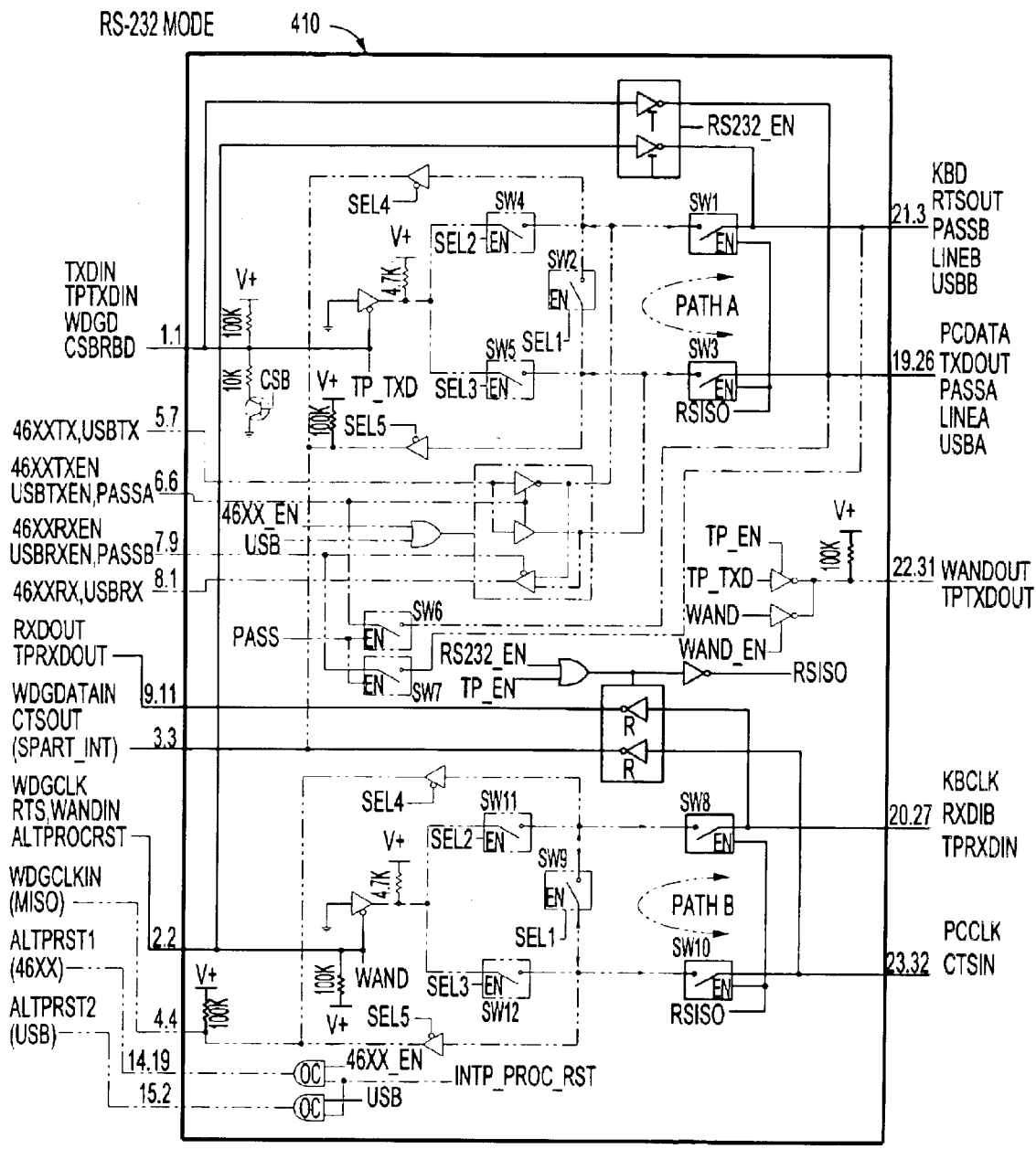
FIG. 6 is a circuit block diagram of the UIDA in FIG. 4, shown in an RS-232C mode.

FIG. 6 illustrates a detailed circuit block diagram of RS-232C interface circuitry 410 UIDA 200 in RS-2332C mode. RS-232 is a well known protocol for serial communication. When the UIDA 200 is active in an RS-232C mode, the pins listed in the RS-232C column of Table D perform the following functions:

TXDIN: TRANSMIT DATA input from the system micro-controller 50.

RTS: READY TO SEND DATA input from the system micro-controller 50.

CTSOUT: CLEAR TO SEND DATA output to the system micro-controller 50.

RXDOUT: RECEIVE DATA output to the system micro-controller 50.

TXDOUT: RS-232C TRANSMIT DATA output to the host system 30.

RXDIN: RS-232C RECEIVE DATA input from the host system 30.

RTSOUT: READY TO SEND DATA output to the host system 30.

CTSIN: CLEAR TO SEND DATA input from the host system 30.

The RS-232 drivers and receivers of the UIDA 200 are preferably constructed to comply with the TIA/EIA-232-F Electrical Specification. When the UIDA 200 is not functioning in RS-232 mode, the input and output impedance of the driver and receiver are set to high impedance (e.g., more than 500k) such that they do not adversely affect the functionality of any other interface drivers (i.e., 110 through 180) that may be active. Switch elements SW1, SW3, SW6, SW7, SW8, and SW10, illustrated in FIG. 6, are bi-directional isolation elements used to protect the logic devices from the bipolar signal generated by the RS-232 elements 410. These elements preferably have relatively low on-state impedance (e.g., 20 Ohms), with the off-state impedance sufficiently high so as to provide adequate isolation from other interface circuitry (e.g., 500 k or more).

Another preferred embodiment of the UIDA 200 will also support RS-232 TTL functionality, as well as the RS-232C functionality described above. FIG. 14 illustrates a detailed circuit block diagram of the RS-232 interface circuitry 490 on the UIDA 200, capable of supporting both RS-232C and RS-232 TTL modes. When the UIDA 200 is active in RS-232 mode, the RS__~TTL pin shown in FIG. 14 operates to configure the RS-232 drivers and receivers. When the RS_~TTL pin is a logic 1, the RS-232 driver and receiver signals will comply with RS-232C levels (+/−5–15VDC). When the pin is a logic 0, the driver and receiver signals will comply with RS-232 TTL logic levels (0–5V DC). If the TPSEL pin shown in FIG. 14 is a logic 1, indicating that the UIDA 200 is installed in a hand held scanner when the test port is activated, the RS—TTL control input is overridden and the RS-232 drivers/receivers are forced to RS-232C drive levels.

IBM46XX (RS-485) Mode

Figure 7:
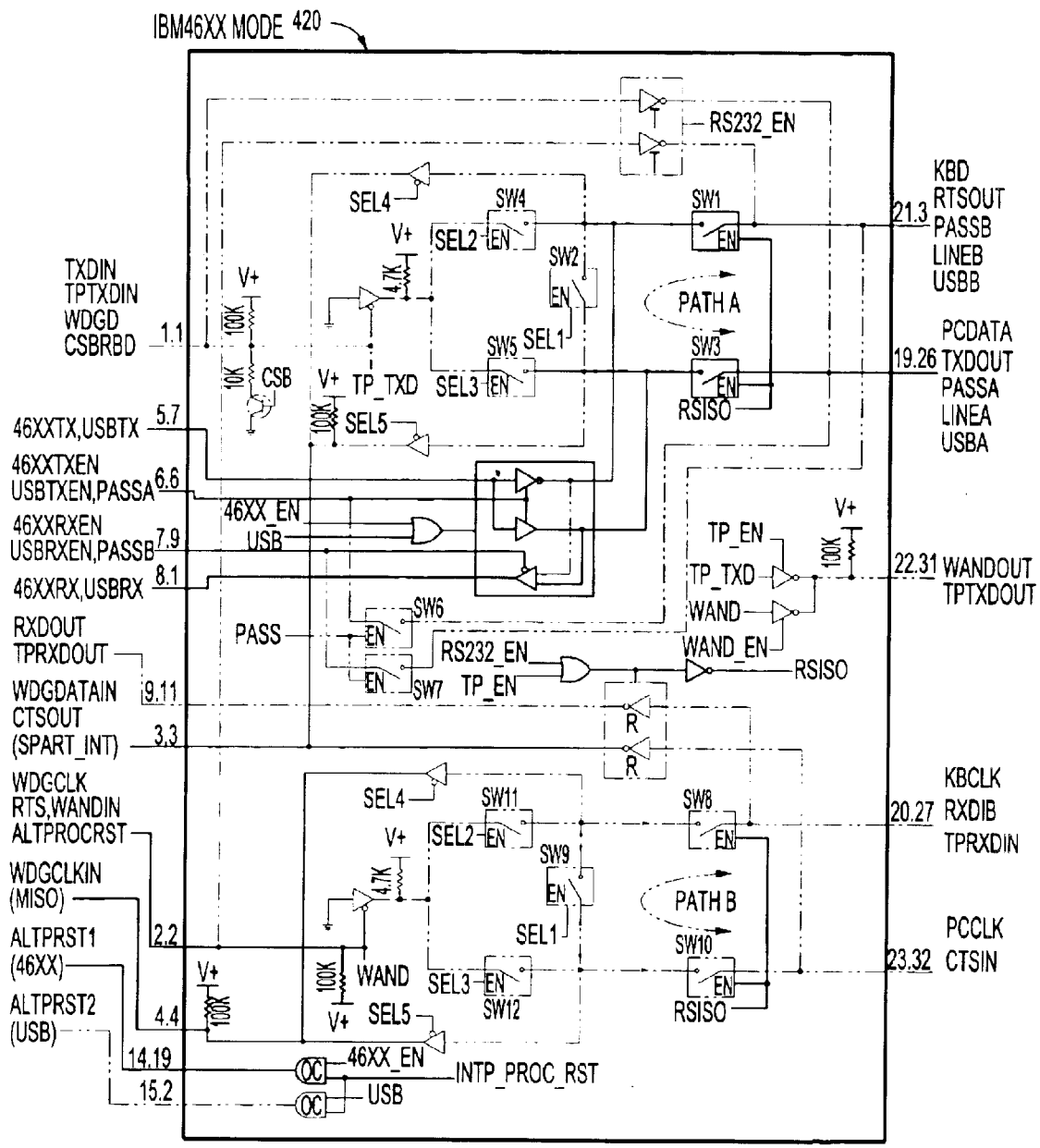
FIG. 7 is a circuit block diagram of the UIDA in FIG. 4, shown in an IBM46XX (RS-485) mode.

FIG. 7 illustrates a detailed circuit block diagram of preferred IBM 46XX interface circuitry 420 UIDA 200 in IBM46XX (RS-485) mode. When the UIDA 200 is active in IBM46XX mode, the pins listed in the 46XX/USB column of Table D perform the following functions:

ALTPROCRST: control input from the system micro-controller 50 (see FIG. 2); used to control the reset pin of the interface specific micro-controller 60.

SPARTINT: is tri-state and is shared with the SPART INTERUPT pin on the interface specific micro-controller 60.

MISO: is also tri-state and is shared with the SPART MISO pin on the interface specific micro-controller 60.

46XXTX: 46XX TRANSMIT DATA input from the system micro-controller 50.

46XXTXEN: 46XX TRANSMIT DATA ENABLE input from the system micro-controller 50.

~46XXRXEN: 46XX RECEIVE DATA ENABLE input from the system micro-controller 50.

46XXRX: 46XX RECEIVE DATA output to the system micro-controller 50.

MOSI: is tri-state and is shared with the SPART MOSI pin on the interface specific micro-controller 60.

46XXSCK: is tri-state and is shared with the SPART Serial Clock pin on the interface specific micro-controller 60.

ALTPRST1: output to control the reset pin on the interface specific micro-controller 60; the control signal originates at the ALTPROCRST pin.

LINEA: normal output signal line of the differential driver portion of the UIDA 200.

LINEB: inverted output signal line of the differential driver portion of the UIDA 200.

The differential driver and receiver used for the IBM46XX (RS-485) interface mode 420 are capable of minimum data rates of 187.5K baud and will drive a 50 foot cable with a characteristic impedance of 60 ohms. This same driver/receiver combination is also used as the USB interface 430 transceiver pair.

Universal Serial Bus (USB) Mode

Figure 8:
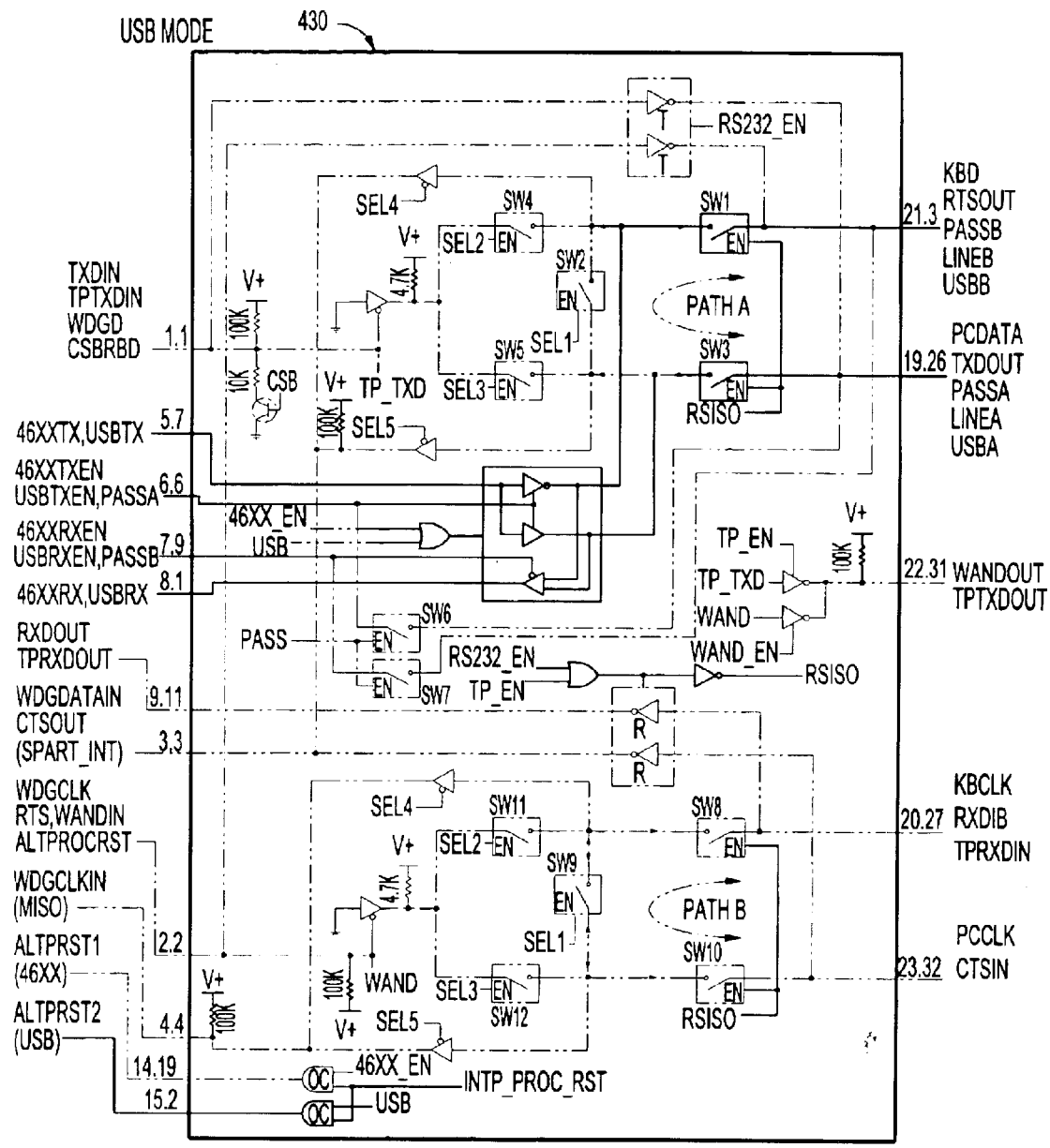
FIG. 8 is a circuit block diagram of the UIDA in FIG. 4, shown in a USB mode.

FIG. 8 illustrates a detailed circuit block diagram of the UIDA 200 in USB mode 430. When the UIDA 200 is active in USB mode 430, the pins listed in the USB column of Table D perform the following functions:

USBTX: USB TRANSMIT DATA input from the system micro-controller 50.

USBTXEN: USB TRANSMIT DATA ENABLE input from the system micro-controller 50.

~USBRXEN: USB RECEIVE DATA ENABLE input from the system micro-controller 50.

USBRX: USB RECEIVE DATA output to the system micro-controller 50. ALTPRST2: output to the control reset pin on the interface specific micro-controller 60.

USBA: normal output signal line of the differential driver portion of the UIDA 200.

USBB: inverted output signal line of the differential driver portion of the UIDA 200.

The differential driver/receiver combination used for the USB interface mode 430 shown in FIG. 8 is capable of minimum data rates of 12 Mbits/s (USB Full Speed) and conforms to the Universal Serial Bus Specification V1. This same driver/receiver combination may also be used as the IBM46XX interface 420 transceiver pair. In another preferred embodiment, the UIDA 200 will also support USB Low Speed functionality (1.5 Mbits/s) as well as USB Full Speed functionality (12 Mbits/s) described above. The Interface Select Logic Block 210 will determine whether the UIDA 200 operates in USB Full Speed mode or USB Low Speed mode based on the different pin signal combinations of CS1, CS10 & CSB (as shown in Table E).

Keyboard Wedge Mode

Figure 9:
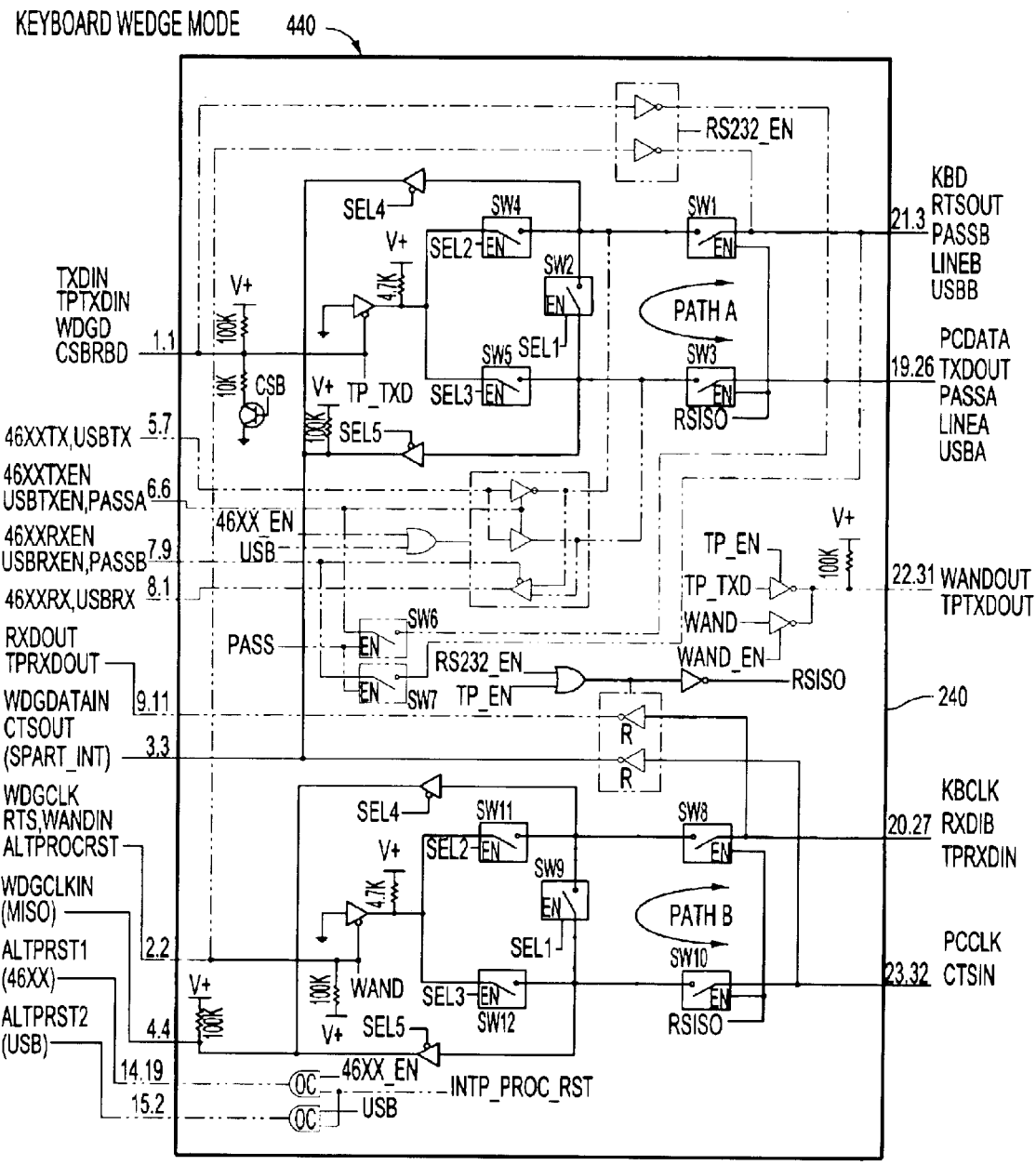
FIG. 9 is a circuit block diagram of the UIDA in FIG. 4, shown in a Keyboard Wedge mode.

FIG. 9 illustrates a detailed circuit block diagram of the UIDA 200 in Keyboard Wedge mode 440. When the UIDA 200 is active in Keyboard Wedge mode 440, the pins listed in the Keyboard Wedge column of Table D perform the following functions:

WDGD: WEDGE DATA TRANSMIT input from the system micro-controller 50.

WDGCK: WEDGE CLOCK TRANSMIT input from the system micro-controller 50.

WDGDATAIN: WEDGE DATA INPUT to the system micro-controller 50.

WDGCKIN: WEDGE CLOCK INPUT to the system micro-controller 50.

HOSTEN & WDGEN: functions were detailed in previous discussion of Wedge Control Logic Block 220; data direction based on the different pin signal combinations is shown in Table C.

PCDATA: connected to scanner output connector, used to transmit or receive data from the host PC.

KBCLK: connected to the scanner output connector, used to transmit or receive the clock signal from the host PC's keyboard.

KBD: connected to the scanner output connector, used to transmit or receive the keyboard data signal from the host PC's keyboard.

PCCLK: connected to the scanner output connector, used to transmit or receive the clock signal from the host PC.

A critical parameter for the Keyboard Wedge interface 440 to operate properly is the series impedance of the switch combination denoted by Path A and Path B in FIG. 9. The series impedance of SW1, SW2, SW3 and SW8, SW9, SW10 must be less than 60 ohms.

Wand Emulation Mode

Figure 10:
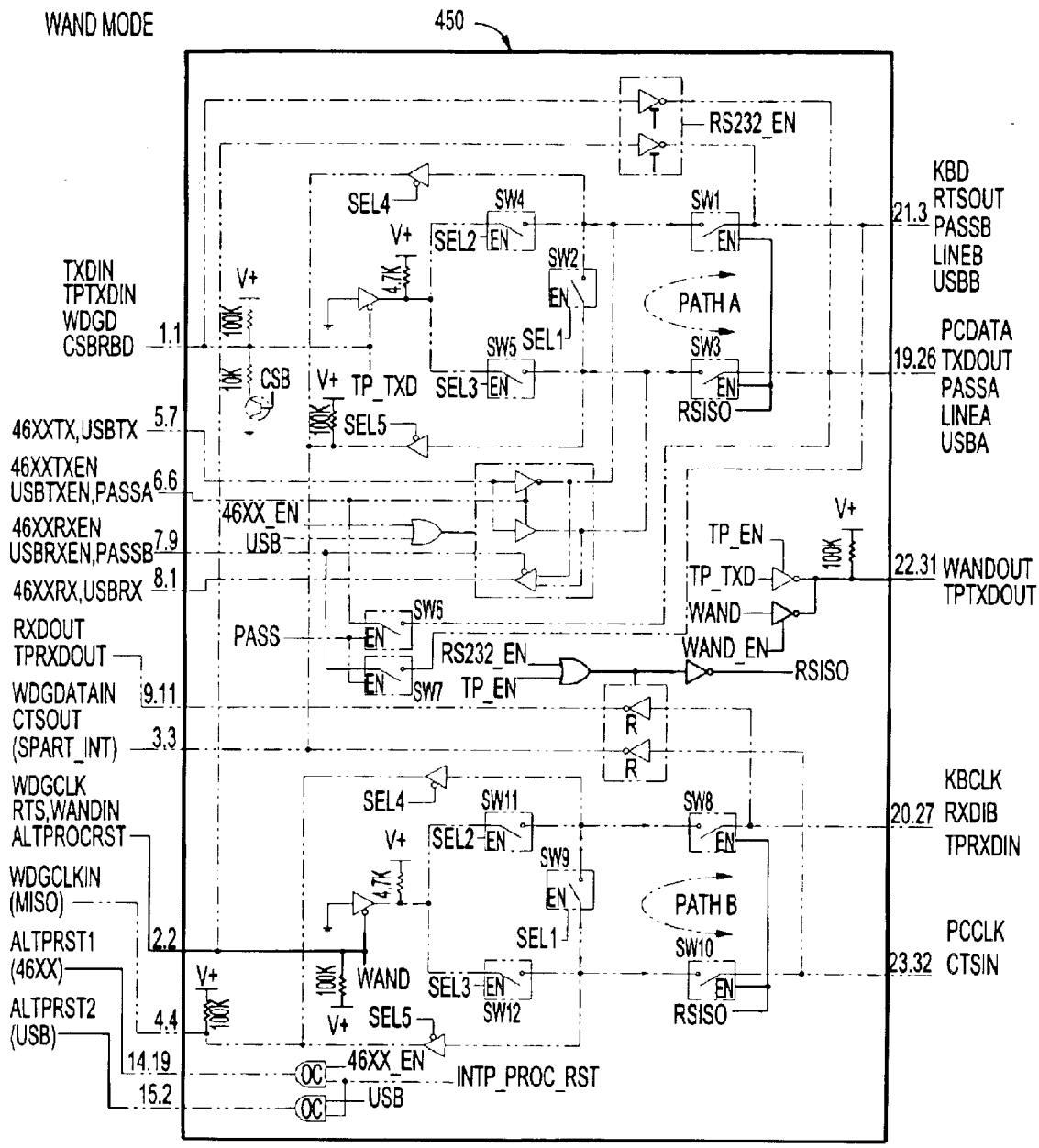
FIG. 10 is a circuit block diagram of the UIDA in FIG. 4, shown in a Wand mode.

FIG. 10 illustrates a detailed circuit block diagram of the UIDA 200 in Wand Emulation mode 450. When the UIDA 200 is active in Wand Emulation mode 450, the pins listed in the Wand column of Table D perform the following functions:

WANDIN: WAND DATA input from the system micro-controller 50.

WAN DOUT: WAND DATA OUTPUT to the host system 30.

The Wand Emulation 450 output consists of an open collector driver and must be capable of sinking 20 mA minimum.

Test Port Mode

Figure 11:
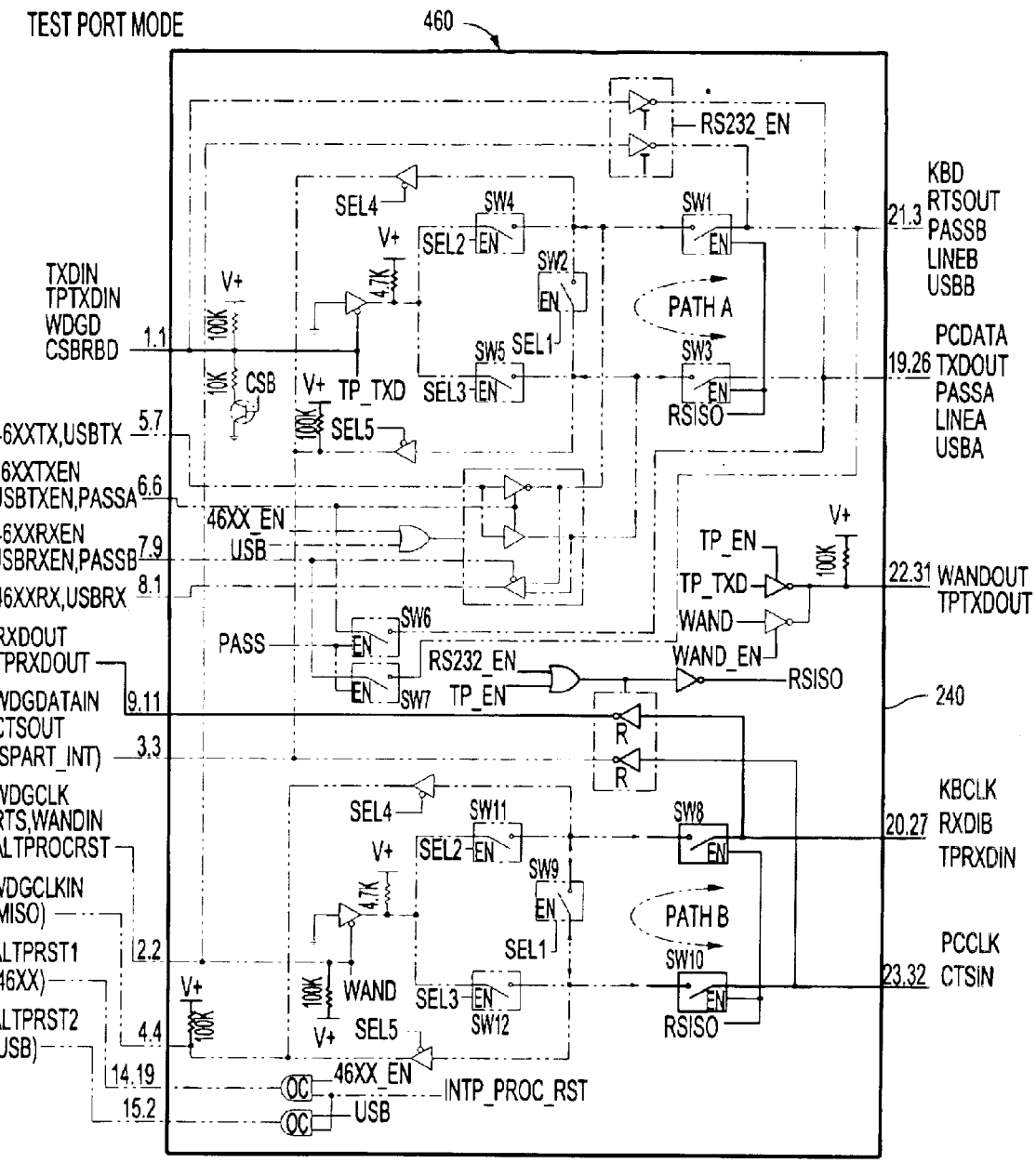
FIG. 11 is a circuit block diagram of the UIDA in FIG. 4, shown in a Test Port mode.

FIG. 11 illustrates a detailed circuit block diagram of the UIDA 200 in Test Port Mode 460. When the UIDA 200 is active in Test Port Mode 460, the pins listed in the Test Port column of Table D perform the following functions:

TPTXDIN: TEST PORT TRANSMIT DATA input from the system micro-controller 50.

TPRXDOUT: TEST PORT RECEIVE DATA output to the system micro-controller 50.

TP_EN: TEST PORT ENABLE pin, enabling transmission and reception of test port signals.

TPRXDIN: TEST PORT RECEIVE DATA input from either the test port adapter or host PC 30.

TPTXDOUT: TEST PORT TRANSMIT DATA OUTPUT to either the test port adapter or host PC 30.

The Test Port output consists of an open collector driver and must be capable of sinking 20 mA minimum.

Pass Through Mode

Figure 12:
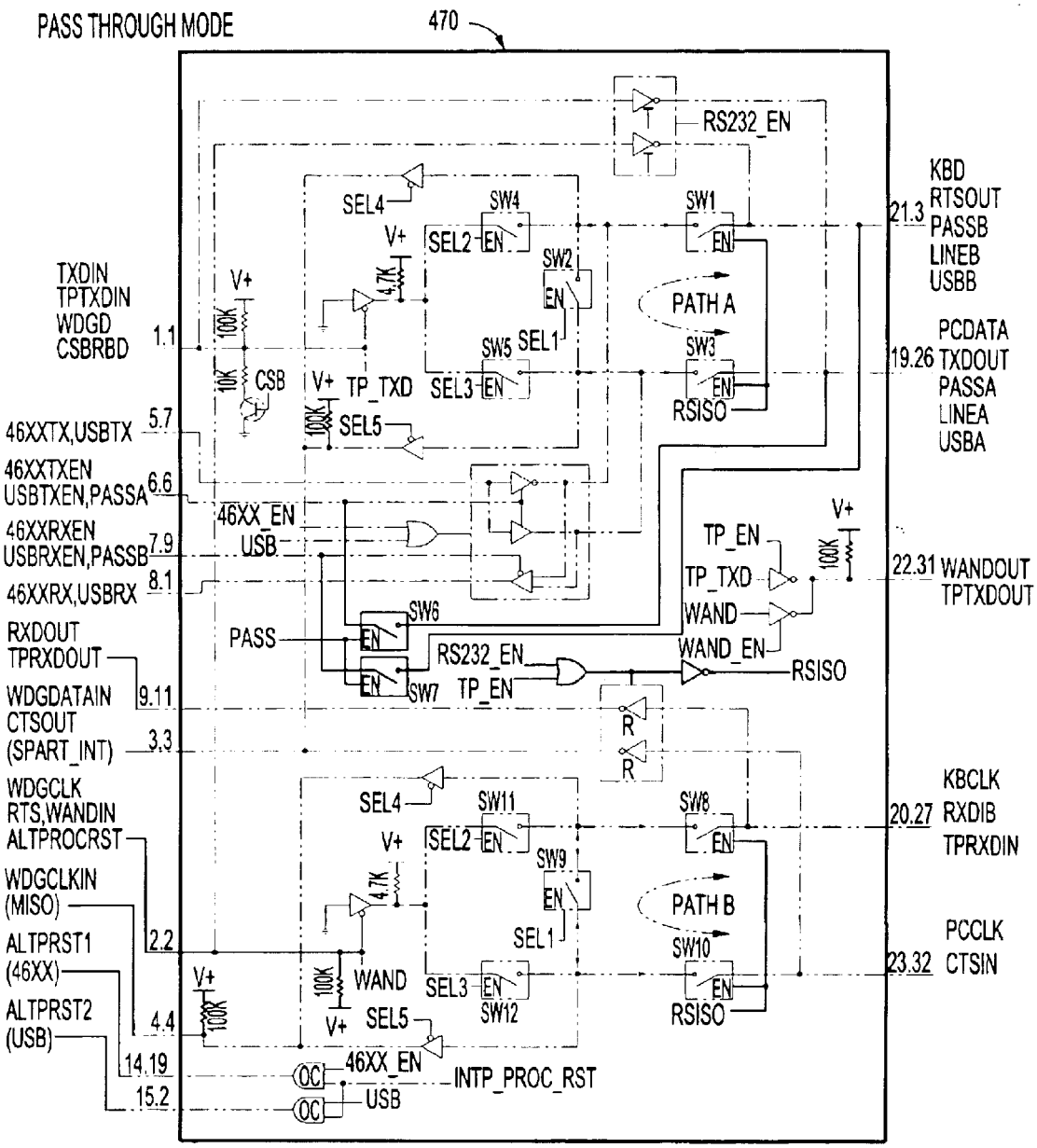
FIG. 12 is a circuit block diagram of the UIDA in FIG. 4, shown in a Pass Through mode.

FIG. 12 illustrates a detailed circuit block diagram of the UIDA 200 in Pass Through Mode 470. When the UIDA 200 is active in Pass Through Mode 470, the pins listed in the Pass column of Table D perform the following functions:

PASSA: bidirectional pass through pin that connects to the second PASSA.

PASSB: bidirectional pass through pin that connects to the second PASSB.

The impedance of switches SW6, SW7, shown in FIG. 12, is a maximum of 20 ohms when the Pass Through function 470 is active.

Cable Select Read Back Mode

Figure 13:
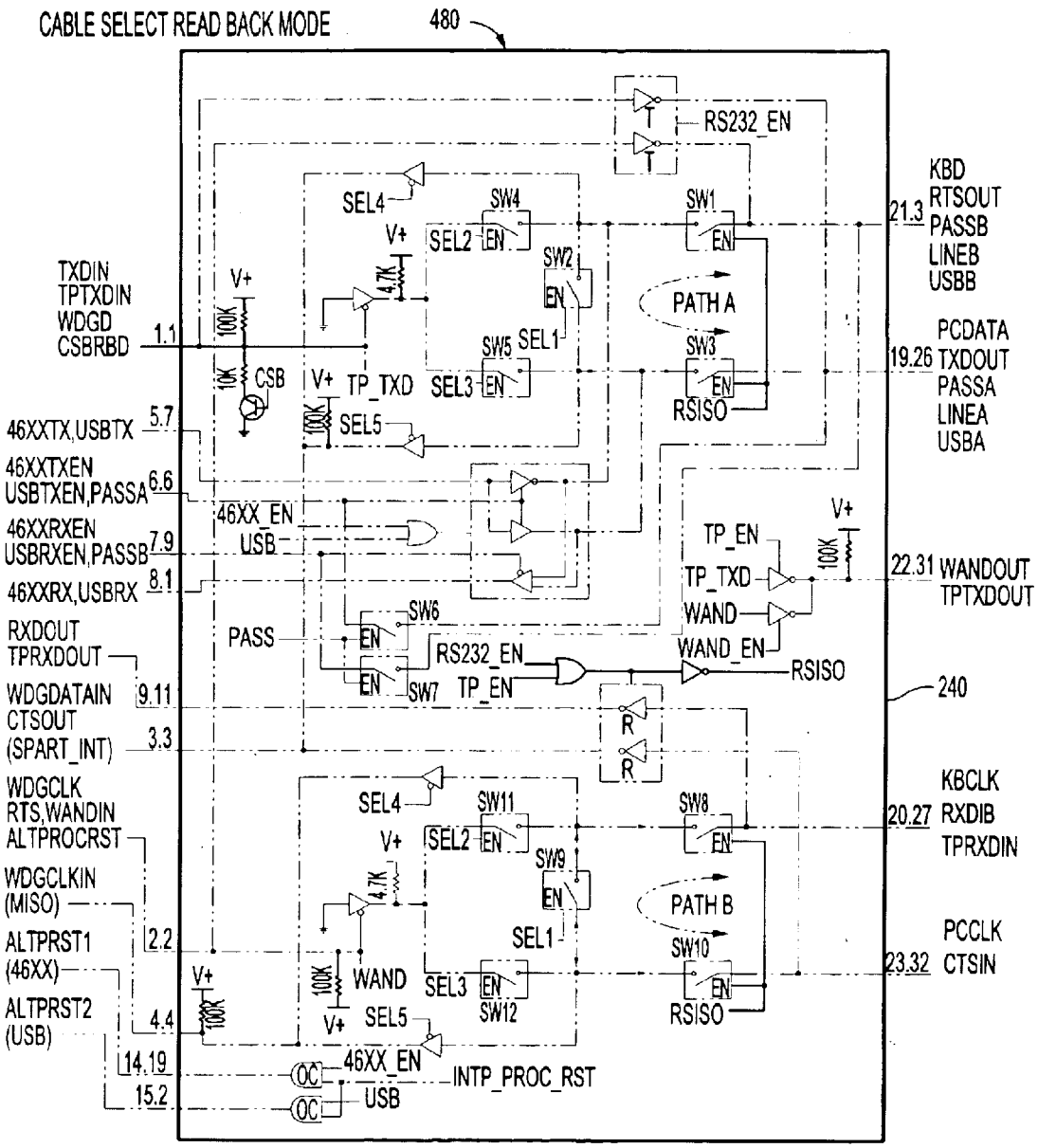
FIG. 13 is a circuit block diagram of the UIDA in FIG. 4, shown in a Cable Select Read Back Mode.

FIG. 13 illustrates a detailed circuit block diagram of the UIDA 200 in Cable Select Read Back Mode 480. When the UIDA 200 is active in Cable Select Read Back Mode 480, the pins listed in the Pass column of Table D perform the following functions:

CSBRD: indicates the inverse of the state of the CSB pin to the system micro-controller 50.

CS1 RD: indicates the inverse of the state of the CS1 pin to the system micro-controller 50.

CS10RD: indicates the inverse of the state of the CS10 pinto the system micro-controller 50.

C51, CS10, CSB: these pins were previously discussed in reference to the Interface Select Logic Block 210. Table B illustrates which interface protocol configuration is selected by the Interface Select Logic Block 210 based on the these pin signal combinations.

OCIA Mode

Another preferred embodiment of the UIDA 200 also supports Optically Coupled Interface Adapter (OCIA) functionality. FIG. 15 illustrates a detailed circuit block diagram of the OCIA interface circuitry 500 on the UIDA 200. When the UIDA 200 is active in OCIA 500, the pins shown in FIG. 15 will perform the following functions:

SDMS: OCIA SDATA TRANSMIT output to the interface micro-controller.

SCLKS: SDATA CLOCK output to the interface micro-controller.

RCLKS: RDATA CLOCK output to the interface micro-controller.

RDATAS: RDATA CLOCK input from the interface micro-controller.

SDATAH: SDATA input from the POS or host system.

SCLKH: SDATA CLOCK input from the POS or host system.

RDATAH: RDATA output to the POS or host system.

RCLKH: RDATA CLOCK output to the host of POS system.

In another preferred embodiment, the UIDA 80 includes circuitry/software/firmware which replaces the interface driver functionality of other data reading devices in order to implement multiple interface driver functionality. Such data reading devices might include, but are not limited to, bar code scanners, magnetic strip readers, CCD imagers, RFID readers and scanner integrated terminals.

Thus, a Universal Interface Driver ASIC for data readers has been shown and described. Numerous modifications may be made to the foregoing invention without departing from the basic teachings thereof. Although the present invention has been described in substantial detail with reference to one or more specific embodiments, those of skill in the art will recognize that changes may be made thereto without departing from the scope and spirit of the invention as set forth above.

From the disclosure herein, it will be apparent to those having skill in the art that many changes may be made to the details of the above-described embodiments without departing from the underlying principles of the invention. The scope of the present invention should, therefore, be determined only by the following claims as issued

What is claimed is:

1. A system for acquiring data and transmitting the data to a host device, the system comprising a data reader;

a communication link for providing communication between said data reader and a host device, said communication link including interface circuitry configurable to a plurality of different host-specific input/output data interface configurations for enabling communication with multiple host processing devices, said interface circuitry being located on an application specific integrated circuit; and isolation circuitry integrated onto said application specific integrated circuit for isolating incompatible interface circuits.

2. A system according to claim 1 wherein the application specific integrated circuit is integrated into the data reader.

3. A system according to claim 1 wherein the application specific integrated circuit is disposed in a separate unit to which the data reader communicates.

4. A system according to claim 1 wherein the interface configurations are selected from the group consisting of: RS-232, RS-232C, RS-232TTL, IBM46XX, USB, keyboard wedge, wand emulation, Test Port, Pass Through, Cable Select Read Back, or Optically Coupled Interface Adapter.

5. A system according to claim 1 wherein the data reader comprises a portable integrated terminal.

6. A system according to claim 1 wherein the data reader is selected from the group consisting of bar code scanner, laser scanner, imaging data reader, one-dimensional CCD reader, two-dimensional CCD reader, RFID reader, magnetic strip reader, and data reader integrated terminal.

7. A system according to claim 1 wherein said isolation circuitry integrated onto said application specific integrated circuit is selected from the group consisting of: micromachined electromechanical relays, analog switches, high voltage transmission gates, and combinations thereof.

8. A system for acquiring data and transmitting the data to a host device, the system comprising
a data reader;
a communication link for providing communication between said data reader and a host device, said communication link including interface circuitry configurable to a plurality of different host-specific input/output data interface configurations for enabling communication with multiple host processing devices, said interface circuitry being located on an application specific integrated circuit,
wherein said application specific integrated circuit including bipolar interface circuitry and unipolar interface circuitry using common communications lines.

9. A system according to claim 8 wherein said application specific integrated circuit further includes one or more analog switches for isolating said unipolar interface circuitry from drive signals of said bipolar interface circuitry.

10. A system according to claim 8 wherein said application specific integrated circuit further includes one or more high voltage transmission gates for isolating said unipolar interface circuitry from drive signals of said bipolar interface circuitry.

11. A system according to claim 8 wherein said application specific integrated circuit further includes one or more micromachined electromechanical relays for isolating said unipolar interface circuitry from drive signals of said bipolar interface circuitry.

12. A system according to claim 8 wherein the application specific integrated circuit is integrated data reader.

13. A system according to claim 8 wherein the application specific integrated circuit is disposed in separate unit to which the data reader communicates.

14. A system according to claim 8 wherein the interface configurations are selected from the group consisting of: RS-232, RS-232C, RS-232TTL, IBM46XX, USB, keyboard wedge, wand emulation, Test Port, Pass Through, Cable Select Read Back, or Optically Coupled Interface Adapter.

15. A system according to claim 8 wherein the data reader comprises a portable integrated terminal.

16. A system according to claim 8 wherein the data reader is selected from the group consisting of bar code scanner, laser scanner, imaging data reader, one-dimensional CCD reader, two-dimensional CCD reader, RFID reader, magnetic strip reader, and data reader integrated terminal.

17. A system according to claim 8 wherein said application specific integrated circuit includes circuitry selected from the group consisting of: micromachined electromechanical relays, analog switches, high voltage transmission gates, and combinations thereof.

18. A system for acquiring data and transmitting the data to a host device, the system comprising
a data reader;
a communication link for providing communication between said data reader and a host device, said communication link including interface circuitry configurable to a plurality of different host-specific input/output data interface configurations for enabling communication with multiple host processing devices, said interface circuitry being located on an application specific integrated circuit, wherein said application specific integrated circuit includes USB interface circuitry and IBM 46XX interface circuitry using common communications lines.

* * * * *

UNITED STATES PATENT AND TRADEMARK OFFICE
CERTIFICATE OF CORRECTION

| | | |
|---|---|---|
| PATENT NO. | : 6,877,663 B2 | |
| APPLICATION NO. | : 10/732690 | |
| DATED | : April 12, 2005 | |
| INVENTOR(S) | : Brian M. Kelly et al. | |

It is certified that error appears in the above-identified patent and that said Letters Patent is hereby corrected as shown below:

Column 4
Line 43, before "16, 16A, 16B" change "FIG." to --FIGS.--.
Line 48 of "OTHER PUBLICATIONS" after "Preferred embodiments will" delete "not".

Column 6
Line 35, change "RS-232C/ITTL" to --RS-232C/TTL--.

Column 7
Line 33, in the table row that begins with "32", change "C1-" to --C1+--.

Column 8
Line 18, before "communicate" insert --to--.
Line 44, before "Select Logic" change "interface" to --Interface--.
Line 60, before "Interface" delete "in the".
Line 65, change "selects" to --select--.

Column 10
Line 23, before "UIDA" delete "by".
Line 55, change "RS-2332C" to --RS-232C--.

Column 13
Line 19, change "WAN DOUT" to --WANDOUT--.
Line 67, changing "pinto" to --pin to--.

Column 14
Line 1, change "C51" to --CS1--.
Line 5, before "these pin signal combinations" delete "the".
Line 13, change "SDMS:" to --SDAAS:--.

UNITED STATES PATENT AND TRADEMARK OFFICE
CERTIFICATE OF CORRECTION

PATENT NO.       : 6,877,663 B2
APPLICATION NO.  : 10/732690
DATED            : April 12, 2005
INVENTOR(S)      : Brian M. Kelly et al.

It is certified that error appears in the above-identified patent and that said Letters Patent is hereby corrected as shown below:

<u>Column 16</u>
Line 7, after "integrated" insert --into the--.
Line 9, before "separate unit" insert --a--.

Signed and Sealed this

Twenty-fifth Day of March, 2008

JON W. DUDAS
*Director of the United States Patent and Trademark Office*